United States Patent [19]

Lewis

[11] Patent Number: 5,796,365

[45] Date of Patent: Aug. 18, 1998

[54] METHOD AND APPARATUS FOR TRACKING A MOVING OBJECT

[76] Inventor: Peter T. Lewis, 2301 Connecticut Ave., NW., Apartment 3B, Washington, D.C. 20008

[21] Appl. No.: 772,509

[22] Filed: Dec. 23, 1996

Related U.S. Application Data

[63] Continuation of Ser. No. 36,533, Mar. 19, 1993, Pat. No. 5,587,715.

[51] Int. Cl.$^6$ .............................. H04B 7/185; G01S 5/02
[52] U.S. Cl. ......................... 342/357; 342/363; 343/712
[58] Field of Search ........................... 342/357, 363, 342/365; 364/449.7; 343/700 MS, 711, 713, 872, 814, 816, 820, 858, 865, 712

[56] References Cited

U.S. PATENT DOCUMENTS

| 3,568,161 | 3/1971 | Knickel. |
|---|---|---|
| 4,086,595 | 4/1978 | Cherenko et al. |
| 4,141,001 | 2/1979 | Boaz. |
| 4,300,140 | 11/1981 | Brandigampola. |
| 4,445,118 | 4/1984 | Taylor et al. |
| 4,596,988 | 6/1986 | Wanka. |
| 4,651,157 | 3/1987 | Gray et al. |
| 4,667,203 | 5/1987 | Counselman, III. |
| 4,701,760 | 10/1987 | Raoux. |
| 4,721,963 | 1/1988 | Nagy et al. |
| 4,728,959 | 3/1988 | Maloney et al. |
| 4,731,613 | 3/1988 | Endo et al. |
| 4,740,792 | 4/1988 | Sagey et al. |
| 4,751,512 | 6/1988 | Longaker. |
| 4,754,283 | 6/1988 | Fowler. |
| 4,791,572 | 12/1988 | Green, III et al. |
| 4,804,967 | 2/1989 | Ohe et al. |
| 4,809,005 | 2/1989 | Counselman, III. |
| 4,812,991 | 3/1989 | Hatch. |
| 4,891,650 | 1/1990 | Sheffer. |
| 4,891,761 | 1/1990 | Gray et al. |
| 4,894,662 | 1/1990 | Counselman, III. |

(List continued on next page.)

FOREIGN PATENT DOCUMENTS 8706713   5/1987   WIPO.

OTHER PUBLICATIONS

*Communication Daily*; vol. 9, No. 61, p. 3; "Mobile Communications; Joint Venture Plans to Compete With Geostar and Qualcomm Satellite Systems".

*Communicatoins of the ACM*; vol. 31, No. 6, p. 638; "Personal computer in the year; Winning entry in 1987 sponsored by Apple Computer Inc.", By Mel; Bartlett W.; Gmohundro, Stephen M. Robinson, Arch D.; Skiena, Steven S.; Thearling, Kurt H.; Young, Luke T.; and Wolfram, Stephen.

*Primary Examiner*—Theodore M. Blum
*Attorney, Agent, or Firm*—Cowan, Liebowitz & Latman, P.C.

[57] ABSTRACT

An apparatus and a method are described for determining with a high degree of accuracy the location of an object, based upon signals transmitted from a plurality of satellites rotating about the earth in known orbits. First, the latitude and longitude of a fixed point is determined with accuracy. The object is capable of moving with respect to the fixed point. Second, the satellite signals are received at the fixed point and processed to determine the approximate latitude and longitude of the fixed point. A first difference between the accurate and approximate latitudes is taken to provide a differential latitude correction of a magnitude corresponding to the first difference and of a direction to the north or south. A second difference between the accurate and approximate longitudes is also taken to provide a differential longitude correction of a magnitude corresponding to the second difference and of a direction to the west or east. The satellite signals are received at the object and processed to determine the approximate latitude and longitude of the object. The approximate object latitude and differential latitude correction are then combined to provide a corrected object latitude of improved accuracy, and the approximate object longitude and differential longitude correction are combined to provide a corrected object longitude of improved accuracy.

22 Claims, 15 Drawing Sheets

U.S. PATENT DOCUMENTS

| | | | |
|---|---|---|---|
| 4,897,642 | 1/1990 | DiLullo et al. | |
| 4,907,290 | 3/1990 | Crompton | |
| 4,912,756 | 3/1990 | Hop | |
| 4,924,699 | 5/1990 | Kuroda et al. | |
| 4,928,107 | 5/1990 | Kuroda et al. | |
| 4,931,808 | 6/1990 | Lalezari et al. | |
| 4,953,198 | 8/1990 | Daly et al. | |
| 4,983,980 | 1/1991 | Ando | |
| 5,003,317 | 3/1991 | Gray et al. | |
| 5,014,066 | 5/1991 | Counselman, III | |
| 5,021,794 | 6/1991 | Lawrence | |
| 5,043,736 | 8/1991 | Darnell et al. | |
| 5,055,851 | 10/1991 | Sheffer | |
| 5,081,462 | 1/1992 | Tachita et al. | 342/352 |
| 5,093,669 | 3/1992 | Kasiyama | |
| 5,119,101 | 6/1992 | Barnard | 342/357 |
| 5,119,102 | 6/1992 | Barnard | |
| 5,119,504 | 6/1992 | Duboraw, III | |
| 5,132,695 | 7/1992 | Dumas et al. | |
| 5,142,281 | 8/1992 | Park | |
| 5,144,318 | 9/1992 | Kishi | 342/357 |
| 5,148,179 | 9/1992 | Allison | |
| 5,155,490 | 10/1992 | Spradley, Jr. et al. | |
| 5,155,491 | 10/1992 | Ando | |
| 5,155,689 | 10/1992 | Wortham | |
| 5,223,844 | 6/1993 | Mansell et al. | 342/357 |
| 5,225,842 | 7/1993 | Brown et al. | 342/357 |
| 5,248,981 | 9/1993 | Yoshihara et al. | 342/357 |
| 5,323,164 | 6/1994 | Endo | 342/357 |
| 5,323,322 | 6/1994 | Mueller et al. | 364/449 |
| 5,355,144 | 10/1994 | Walton et al. | |
| 5,365,447 | 11/1994 | Dennis | 364/449 |
| 5,390,124 | 2/1995 | Kyrtsos | 364/449 |
| 5,402,134 | 3/1995 | Miller et al. | |
| 5,426,006 | 6/1995 | Delnick et al. | |
| 5,438,517 | 8/1995 | Sennott et al. | 364/449 |

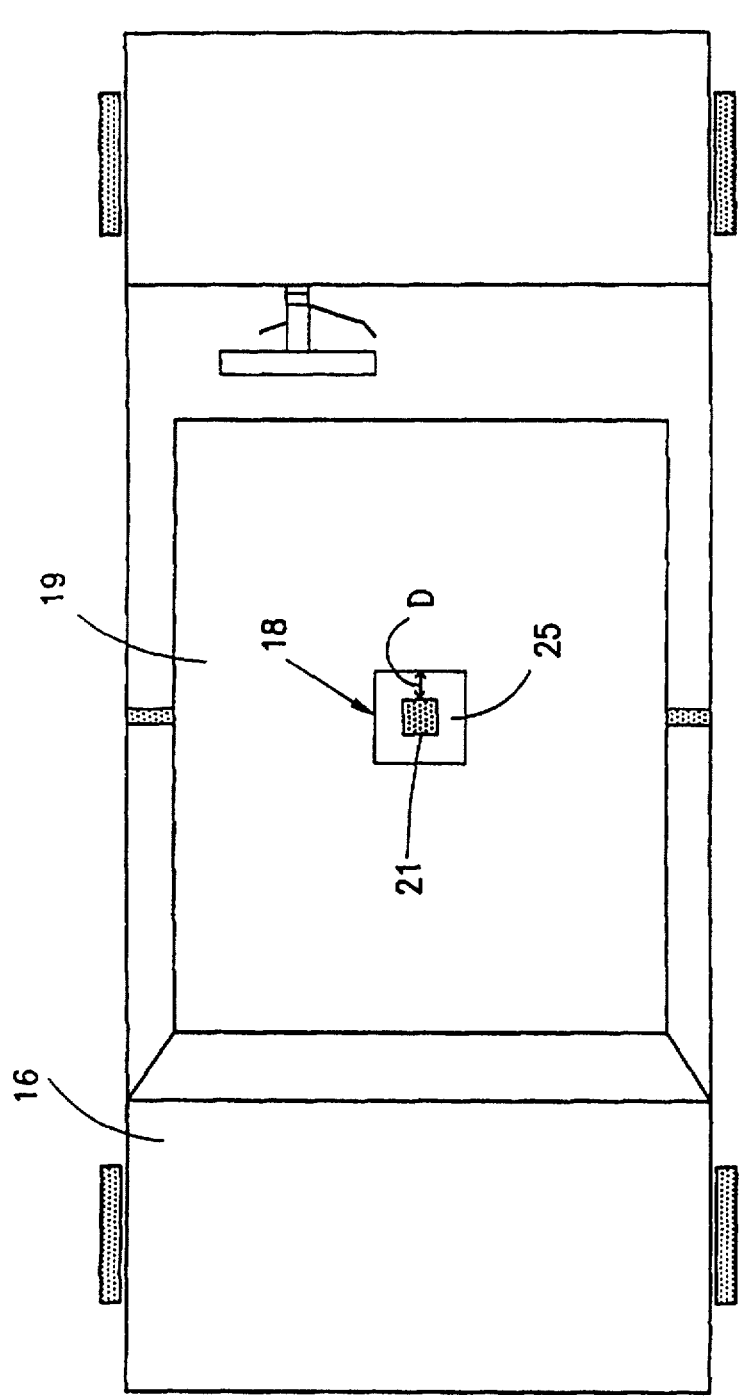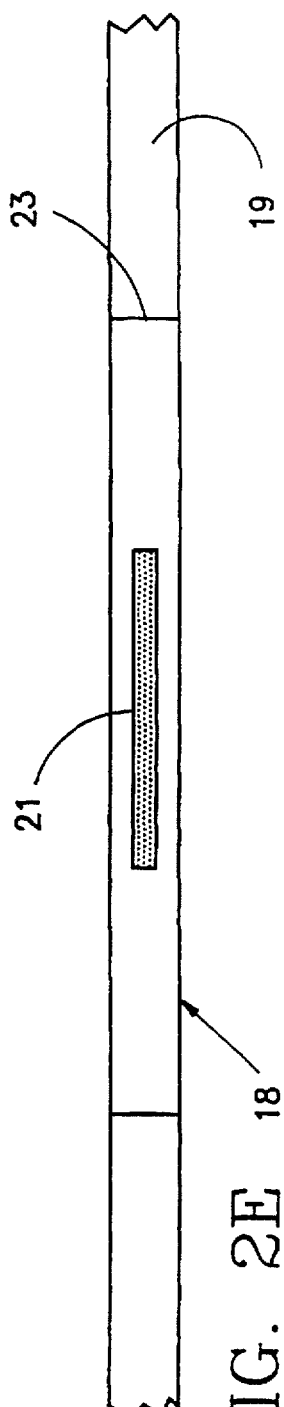
FIG. 2D
FIG. 2E

METHOD AND APPARATUS FOR TRACKING A MOVING OBJECT

This application is a Continuation of U.S. patent application Ser. No. 08/036,533 (issued Dec. 24, 1996 as U.S. Pat. No. 5,587,715), entitled, "METHOD AND APPARATUS FOR TRACKING A MOVING OBJECT" filed Mar. 19, 1993, in the name of Peter T. Lewis.

FIELD OF THE INVENTION

This invention relates to a method and apparatus for tracking the location in terms of latitude and longitude of an object with a high degree of accuracy. This invention is designed for use with a wide range of vehicles including those adapted to be used on land, on water and in the air and, in particular, with automobiles and trucks, to track their location. In the event of unauthorized entry and/or theft, this invention provides a warning signal along with the present location of that vehicle to a command center. This invention in its preferred, illustrative embodiment combines in a new and nonobvious manner well known technologies such as the available Global Positioning Systems (GPS) and the cellular telephone systems.

BACKGROUND OF THE INVENTION

GPS Systems have been adapted in the prior art to track objects and vehicles. All-weather GPS systems, which have been designed and implemented by the United States Department of Defense, are intended to be comprised of 24 satellites (21 of which shall be active and 3 of which will be on standby), ground control stations, and individual GPS receiver units throughout the world. The satellites are placed in elliptical orbits and are evenly distributed in 6 spheres of four satellites each. The satellites are disposed approximately 10,900 nautical miles above the earth and maintain orbit longitudinal spacing angles of about 60 degrees from each other. The GPS satellites orbit about the centrally disposed earth. The semimajor axis of each satellite is controlled to maintain equal spacing from the earth so that the satellites pass over a given location on earth at predictable, periodic pass-by times, e.g., regularly in 12 hour intervals. Thus, each GPS satellite concludes a complete orbit twice daily. Thus, assuming a complete constellation of GPS satellites, an average of 4.8 satellites would be in view at any given time from any given location on earth, notwithstanding signal obscuration by trees, mountains, buildings and other natural and manmade obstacles.

The former Soviet Union had been launching similar positioning satellites dubbed "GLONASS." There is a strong possibility that the GPS and GLONASS systems may be combined into one mega-constellation of positioning satellites. Accordingly, the invention herein contemplates the usage of GLONASS and other like systems.

The position of each GPS satellite in its orbit may be precisely determined. Each satellite includes an atomic clock, whereby the time at which a signal is transmitted from that satellite is precisely known. The object, whose latitude and longitude on earth is to be tracked, includes a ground GPS receiver for receiving and processing these satellite signals. A ground GPS receiver also includes a clock and a computer processing unit (CPU), which together are capable of determining the propagation time, i.e., the time required for signals to be propagated from the satellite to the ground GPS receiver, and therefore is capable of calculating the distance between each of at least three satellites and the ground GPS receiver to thereby accurately determine by well known triangulation techniques its position in terms of latitude and longitude on earth. In particular, the distance between a particular satellite and the ground GPS receiver is the product of the velocity of light, i.e., 186,000 miles per second, and the determined propagation time. To calculate object location it is also necessary to know accurately the positions of the satellites. The ground GPS receivers store therein data indicative of the continuously changing positions of all of the active satellites in the GPS system. Such data is transmitted by each satellite to the ground GPS receivers to use in these object location calculations. When signals from three satellites are received by a ground GPS receiver, a 2-dimensional position, i.e., latitude and longitude, may be determined. When signals from four satellites are received by the GPS receiver, a 3-dimensional position, i.e., latitude, longitude and altitude, may be determined.

The Department of Defense operates its GPS system to provide two distinct services. The first or Precise Positioning Service (PPS) is reserved for military use and is believed to be capable of determining object location to an accuracy of at least one meter. A second, less precise system known as the Standard Positioning Service (SPS) is available for general civilian use.

The accuracy of the propagation time determination and therefore the calculations of the distances between the ground GPS receiver and each of the overhead satellites, is dependent directly on the accuracy of the clock included in the ground GPS receiver. The accuracy of the receiver clock is maintained by synchronizing it with the operation of the satellite's atomic clock by transmitting a binary pseudo-random code from each satellite to the ground GPS receiver. As will be explained, the Precise Positioning Service and the Standard Positioning Service use different methods and pseudo-random codes for synchronizing the receiver clocks.

The accuracy of the object location calculations is thus dependent upon the accuracy of the clock of the ground GPS receiver. To calculate position location to an accuracy of one meter, the ground receiver clock and therefore the calculation of the propagation times require an accuracy of better than 100 ns. To maintain receiver clock accuracy, the satellites transmit timing marks at approximately one microsecond intervals. The ground receivers' clocks differ from the satellite clocks by an error or clock bias $C_B$. Dependent upon the error or bias $C_B$ of the ground receiver clock, the object location calculations performed by the ground receivers are all in error by a fixed amount, which is called a pseudo-range "n".

Relative uncertainties in the calculations of object location by the ground GPS receiver occur because of several factors such as ionospheric delays, ambient temperature fluctuations and Doppler shift. Such uncertainties are expressed collectively as the dilution of precision. The Department of Defense increases the dilution of precision when it implements a policy of unscheduled Selective Availability in its Standard Positioning Service, which causes the calculated object location to appear off by the pseudo-range n, where n is whatever the Department of Defense selects, but generally, not in excess of such a value where n would cause an inaccuracy over 100 meters. The Department of Defense uses Selective Availability to prevent potential aggressors against the United States to employ the GPS system in a potential attack. However, Selective Availability, especially when combined with those elements contributing to normal dilution of precision, could prove to be detrimental to civilian uses of the Standard Positioning Service, inducing varying errors into the calculations of object location by ground GPS receivers.

Each satellite transmits at a rate of 50 bps a tri-group of data in a direct sequence spread spectrum (DSSS) form, containing therein information concerning the almanac, ephemeris, and clock correction. The almanac, which is generally reliable for a period of at least 30 days, contains general information regarding the position of the entire GPS constellation. The ephemeris is satellite-specific progression and path information, which is generally reliable for up to 120 minutes (the duration of time during which the geographical footprint generated by reliable signals made on earth from a satellite vehicle is of sufficient strength to reliably participate in a positioning fix). The clock correction parameters are necessary because even atomic clocks are not perfect and such timing offsets, while greatly compensated for with ground relayed referencing to the National Observatory time standardization in the District of Columbia, may be further corrected with user-corrected referencing. The satellites transmit their signals in both the Precise and Standard Positioning Services on a common carrier frequency within the L-band's upper limit at 1575.42 MHz (L1), carrying with this frequency two distinct, binary pseudo-random codes emitted at two chip rates corresponding respectively to the Precise Positioning Service and the Standard Positioning Service. The chip rate for the Precise Positioning Service is 10.23 MHz, which is associated with a Precise or P-code. In the case of the Standard Positioning Service, a pseudo-random noise signal (PRN), which has a chip rate of 1.023 MHz and is unique to each satellite, is used to spread the spectrum of the transmitted information about the center frequency. The pseudo-random noise signal is known as a coarse/acquisition (C/A) code since it provides the timing marks required for fast acquisition of GPS signals and coarse navigation. Each satellite has a different spread spectrum access code for both a clear acquisition (C/A) and a precision (P) code. The C/A code is a pseudo-random string of ones and zeros applied to a device which controls the carrier phase in 180 degree increments. This technique is known as bi-phase direct sequence spread spectrum at the 1.023 MHz chip rate. The P code is much longer in length and is applied at the 10.23 MHz chip rate. Details of the GPS are given in NAVIGATION: Journal of the Institution of Navigation, Vol. 25, No. 2, December 1978. The satellites repeatedly transmit at 1-millisecond intervals their pseudo-random codes to the ground GPS receivers. The signals received at a ground receiver have a bandwidth of approximately 2 MHz and a signal-to-noise ratio (S/N) of approximately −20 db.

Since the satellites are each moving at a speed in excess of 3 km/s, the GPS signals are received with a Doppler frequency offset from the GPS center frequency. As a result, a stationary ground GPS receiver has to be capable of receiving signals with frequencies of up to + or −4 KHz from the GPS center frequency, and a mobile receiver (as is usually the case) has to be able to receive signals over an even greater frequency range. To recover the data and measure the propagation time of the satellite signals, the ground GPS receiver must compensate for the Doppler frequency offset and also synchronize its clock with the atomic clock of a satellite by generating the C/A code corresponding to each satellite. In particular, the ground GPS receiver must generate a replica of the pseudo code transmitted from the satellite for control of an internal phase switch and synchronize the code in time with the code received at its antenna in order to recover the carrier frequency. The code time with respect to the receiver's clock is measured for four satellites and used for determining the position of the GPS receiver on the earth. See, for example, U.S. Pat. Nos. 4,457,006 and 4,114,155. Initially, at least, this synchronizing can be very time consuming since to despread the DSSS signals, the incoming and locally generated PRN code delay, the ground GPS receiver must compare the locally generated code and the incoming code at a number of different positions until the point of synchronism or correlation is found. With a code length of 1023 chips this comparison can be a lengthy procedure. However, once the frequency offset and the PRN code delay for each satellite are known, tracking them is relatively easy.

U.S. Pat. No. 4,983,980 contemplates the mounting of a GPS receiver on a vehicle, for determining the location of that vehicle as it moves from place to place. This patent contemplates that such a vehicle may pass through a tunnel, whereby the GPS receiver may lose the transmission of the GPS signals from the satellites. Even after the vehicle emerges from the tunnel, it takes time for the vehicle's GPS receiver to reestablish reception of the satellite signal. In particular, GPS satellites continuously rotate about the earth, whereby the center frequency of the satellite signal is shifted due to the Doppler effect when received by the ground GPS receiver disposed at a relatively stationary position on the earth. The ground GPS receiver initiates receiving of the spread-spectrum signal from the satellite by locking a phase-locked loop (PLL) circuit of the GPS receiver to the center frequency of the GPS signal which may be shifted by the Doppler effect. Upon locking of the PLL circuit, the spread-spectrum signal is despread and demodulated to receive the GPS signal. Thus even after the vehicle emerges from the tunnel and its GPS receiver again has a line of sight contact with an overhead signal, the GPS receiver of the vehicle requires some delay before the satellite signal is received and demodulated and may again start calculating the vehicle position. This patent discloses a ground GPS receiver, which comprise a clock and a random access memory for storing the latitude and longitude of a last-known location, e.g., the latitude and longitude of Tokyo when the vehicle is driven in Japan, and for using the almanac information of each GPS satellite to determine the position of the satellites, when the vehicle reemerges into direct line of sight with the satellites. In particular, the GPS receiver identifies the strongest satellites at the highest mask angle (reference to the horizonal plane) at the time when the vehicle reappears from the tunnel and has a direct line of sight with the satellites.

In those applications where a GPS receiver is mounted on a vehicle, the receiver may be used for security application. For example, the GPS receiver may continue to calculate the vehicle location and to transmit that location to a distant point, where location data may be used by the police to track the vehicle. For example, if the vehicle is stolen, the vehicle owner or, preferably, the police could use the vehicle location to retrieve the vehicle, apprehend the thief and to discourage the theft of the vehicle, in the first instance. In potential security applications as well as in everyday tracking of the vehicle, the vehicle may be taken to places, wherein its GPS receiver may no longer receive satellite signals. For example, the vehicle may be taken into an underground garage. Vehicles may be kept in such places for hours or even days and then emerge so that its GPS receiver may again reacquire transmission of the satellite signals and to again calculate the vehicle's location.

U.S. Pat. Nos. 5,043,736 and 5,119,102 disclose the combination of a GPS receiver and a transmitter for transmitting GPS system data from the receiver to a remote base station. The '736 patent suggests that the transmitter be implemented by cellular system technology.

U.S. Pat. No. 4,751,512 suggests improving the accuracy provided by a GPS system operated in the Standard Positioning Service by operating such a system in a so called "differential mode". Generally, operation in differential mode involves combining navigational information received at two different receivers, where the location of one of the receivers is known. By combining the data, the location the other receiver can be determined with greater accuracy than would be possible through using the data received by that other receiver alone. In particular, a GPS receiver may be disposed at a known location to determine the difference between its known location and its location predicted based upon receiving the satellite signals and calculating therefrom the approximate location. This difference reflects errors in the information received including those deliberately induced by the Department of Defense in its Standard Positioning Service. This differential data must be communicated from the reference receiver to a user, who is typically displaced from the reference station. The '512 patent particularly suggests that the associated transmitting unit transmit the differential data via a commercial geosynchronous earth satellite relay to a user located no more than 500 miles from the reference receiver.

SUMMARY OF THE INVENTION

It is an object of this invention to improve the accuracy of determining the location of a object based upon signals received from a subset of a plurality of satellites, each of which is deposed in a known orbit about the earth.

It is another object of this invention to compensate for errors, which are deliberately introduced or caused by environmental conditions in the determination of objects based on the reception and processing of signals from satellites.

It is a further object of this invention to permit differential correction of object determinations based on the reception and processing of satellite signals over a large geographic area.

It is a still further object of this invention to efficiently recapture lost satellite signals and to begin again to process the recaptured satellite signals to determine object location with a minimum of delay.

It is another object of this invention to quickly establish communication with a person, object and/or vehicle whose location within a large geographic area is not known.

It is a further object of this invention to prompt a person, object and/or vehicle to call via a cellular telephone to a known address or telephone number.

It is another object of this invention to disguise an antenna for receiving satellite signals for mounting on a vehicle.

It is a still further object of this invention to protect an object, e.g., an automobile, by detecting its unauthorized use to automatically transmit an alarm message carrying the current location of the object to a command center.

In accordance with these and other objects of the invention, there is described an apparatus and a method of determining with a high degree of accuracy the location of an object based upon signals transmitted from a plurality of satellites rotating about the earth in known orbits. First, the latitude and longitude of a fixed point is determined with accuracy. The object is capable of moving with respect to the fixed point. Second, the satellite signals are received at the fixed point and processed to determine the approximate latitude and longitude of the fixed point. A first difference between the accurate and approximate latitudes is taken to provide a differential latitude correction of a magnitude corresponding to the first difference and of a direction to the north or south. A second difference between the accurate and approximate longitudes is also taken to provide a differential longitude correction of a magnitude corresponding to the second difference and of a direction to the east or west. The satellite signals are received at the object and processed to determine the approximate latitude and longitude of the object. The approximate object latitude and differential latitude correction are then combined to provide a corrected object latitude of improved accuracy, and the approximate object longitude and differential longitude correction are combined to provide a corrected object longitude of improved accuracy.

In a further aspect of this invention, there is disclosed an object location system, which comprises a command center, and a plurality of differential stations distributed throughout a geographical area at a plurality of corresponding fixed points. The object is capable of moving throughout this geographical area. Each fixed point is disposed at a known location. Each of the plurality of differential stations operates to receive and process signals from a corresponding subset of the plurality of satellites presently in sight of the differential station to provide a signal indicative of the approximate location of the corresponding fixed point and differential station. Signals indicative of the approximate and accurate locations of each of the fixed points are compared to provide differential data. A unit mounted on the object and movable with the object throughout the geographical area, receives and processes signals from a given subset of the plurality of satellites presently in sight of the object to provide a signal indicative of the approximate location of its object. The unit includes a first actuable transmitter for transmitting a message indicative of the location of its object to the command center. The command center has a first receiver for receiving the differential data and the approximate object location signal from the unit's transmitter, and a processor for determining based upon the approximate object location and the known locations of the fixed points a determined one of the corresponding differential stations which is presently in sight of the same subset of satellites as the object. The system includes a processor for combining the approximate object location signal and the differential data from the determined one differential station to provide an indication of the object's location with greater accuracy.

In another aspect of this invention, there is disclosed an apparatus and method for determining the location of an object based on satellite signals, which comprise satellite orbit data. A memory is provided for storing the satellite orbit data, and a clock provides the current time. Upon detecting the cessation of receiving the satellite signals, the last received satellite orbit data is stored in the memory. The recapture of the satellite signals is detected to determine a length of time that the apparatus was not receiving satellite signals. That length of time is compared with a given period and, if less, the stored satellite orbit data is accessed from the memory, and the current time is taken from the clock to determine the present subset of the plurality of satellites that is in direct view of the object, before restarting the location determining apparatus to receive again the signals from the determined subset of satellites. If the determined length of time is greater than the given period, the plurality of satellites is sequentially searched one at a time until a satellite transmitting a signal having a strength greater than a threshold level is detected, and the signal from the one detected satellite is recaptured.

In a still further feature of this invention, there is disclosed security apparatus adapted to be mounted on a vehicle, which comprises a receiver for receiving and processing satellite signals to provide the current location of the vehicle, an actuable transmitter for transmitting an alarm message to a remote station, and a mechanism responsive to an unauthorized use of the vehicle for accessing the current location of the vehicle and for actuating a transmitter to transmit the alarm message indicative of the unauthorized use of the vehicle and the current location of the vehicle to the remote station.

In a still further aspect of this invention, there is disclosed a system for prompting a selected one of a plurality of vehicles, each with an unique address, anywhere in a relatively large geographical area to initiate transmission of a message to a remote location of an unique address. The geographical area includes a plurality of subareas. The system comprises an actuable transmitter mounted on each of the vehicles for transmitting the addressed messages within that one of the plurality of subareas where each vehicle is presently located. There is further included a first communication system, which comprises a plurality of receivers, each receiver disposed within one subarea for receiving all of the addressed messages transmitted within its subarea and for transmitting the addressed message to the remote location. There is also included a second communication system for transmitting a prompt message with its unique ID simultaneously throughout the entire geographical area. A receiver is mounted on each vehicle for receiving the prompt messages and is responsive to one of the prompt messages with a like ID for actuating its transmitter to transmit its addressed message.

BRIEF DESCRIPTION OF THE DRAWINGS

A written description setting forth the best modes presently known for carrying out the present invention, and of the manner implemented and using it, is provided by the following detailed description of an illustrative embodiment represented in the attached drawings herein.

DETAILED DESCRIPTION OF AN ILLUSTRATIVE EMBODIMENT OF THE PRESENT INVENTION

Figure 1A:
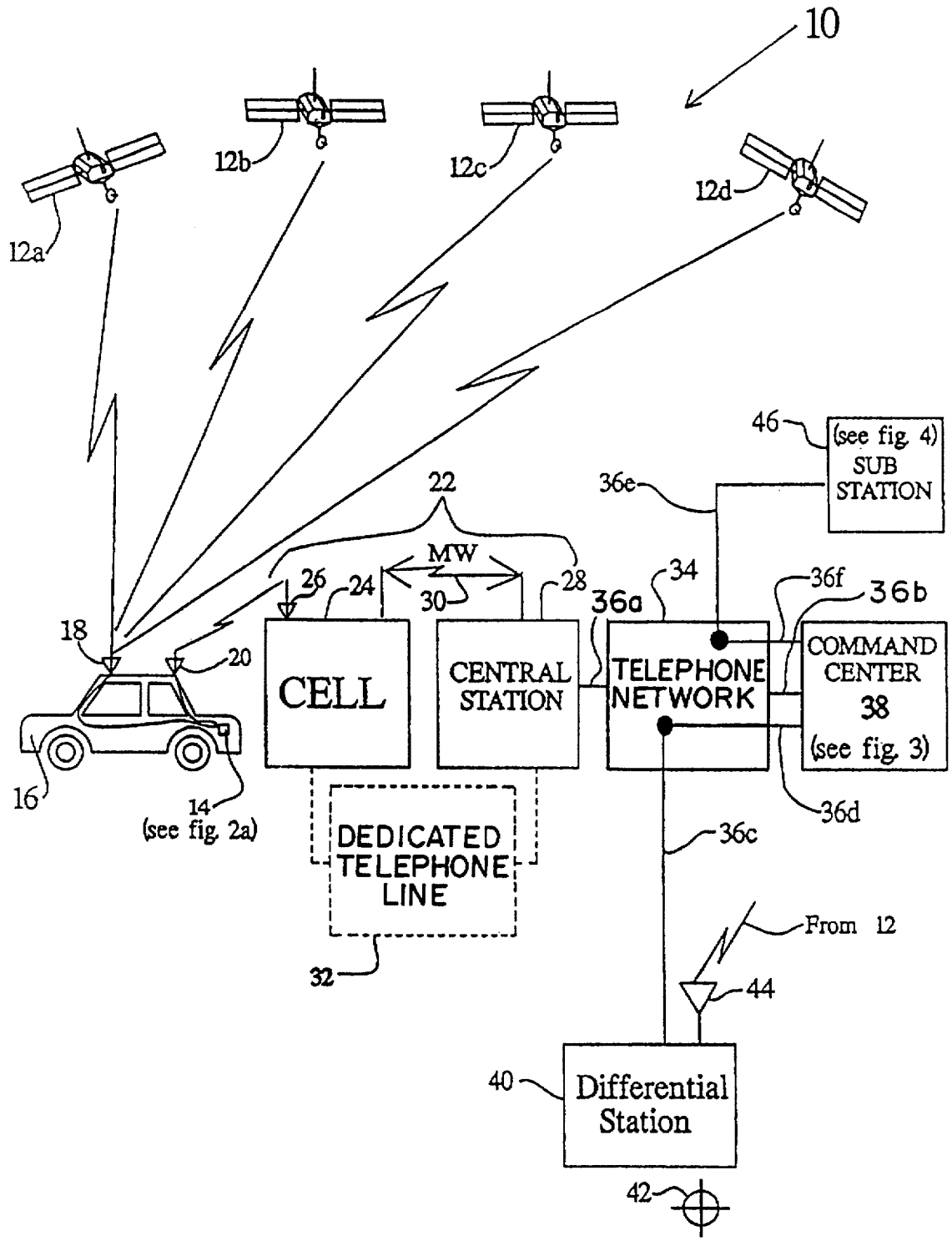
FIGS. 1A and B are respectively an overall block diagram of an object or vehicle tracking system in accordance with the teachings of this invention, and a map of a large area in which objects are to be tracked, showing the placement of a single command center and a plurality of differential stations as shown in FIG. 1A.

Referring now to the drawings and in particular to FIG. 1, there is shown an overall functional block diagram of the method and apparatus of this invention. In particular, this invention relates to a GPS system, which includes a plurality of satellites 12a, b, c and d. Each such satellite 12 transmits a GPS signal as described above to be received by an antenna 18, which is coupled to a vehicle tracking unit 14 and, more specifically, to a ground GPS receiver 48. Though the tracking unit 14 could be used with and attached with any object, it is mounted in a preferred embodiment of this invention on a vehicle 16, e.g. an automobile. In a preferred embodiment of this invention, the vehicle tracking unit 14 receives and processes the GPS signal to repetitively provide in real time a series of signals, which indicate the present position of the vehicle 16 in terms of its latitude and longitude with a high degree of accuracy.

Figure 3:
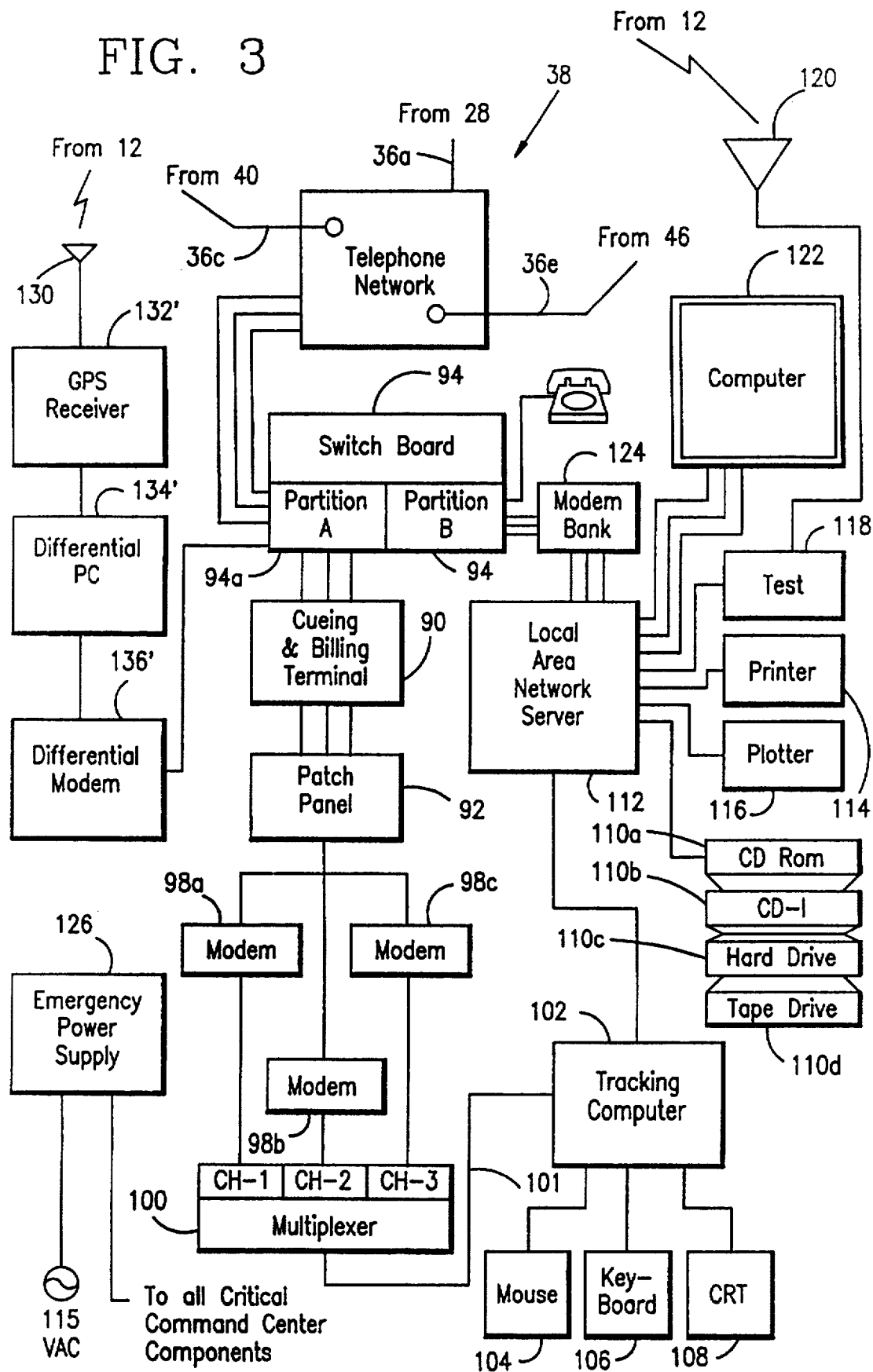
FIG. 3 is a functional block diagram of the command center included within the system of FIG. 1.

As will be explained below, the vehicle tracking unit 14 in turn transmits these location indicating signals via an antenna 20 to a distant command center 38, which will be described below with regard to FIG. 3. In an illustrative embodiment of this invention, the transmission of the location defining signal from the vehicle tracking unit 14 is accomplished by the use of a mobile telephone system 22 and, in particular, by a cellular phone system. As is well known in the art, the cellular phone system 22 includes a plurality of cells 24, each including an antenna 26 for receiving the signals transmitted from the vehicle tracking unit 14 as well as signals from similar cellular phones within its geographically defined boundaries. The cell 24 in turn transmits the signals from the cellular phones within its territory via a microwave transmission system 30 to a central station 28. The central station 28 may be illustratively connected by a conventional telephone network to the command center 38.

In a preferred embodiment of this invention, the vehicle tracking unit 14 is particularly adapted to serve a security function. If an unauthorized person attempts to enter or steals the vehicle 16, the vehicle tracking unit 14 transmits a message so indicating to the command center 38. Personnel at the command center 38 respond to such a message by informing the appropriate authorities of the theft and the location of the vehicle 16, whereby the police may intercept the vehicle 16 and return it to its owner. Alternatively, communication between the cell 24 and the central station 28 may by effected over a dedicated telephone line 32.

To offset the dilution of precision, whether due to natural or deliberate causes, one or more differential stations 40 are included within the position determining system 10. As will be explained, each differential station 40 includes a ground GPS receiver for receiving GPS signals from the satellites 12 and is associated with a reference point 42, whose location in terms of latitude and longitude have been surveyed and are known with a high degree of accuracy. Basically, the differential station 40 receives through its antenna 40 and processes the GPS signals to calculate therefrom the location of the differential station and compare that calculated location with the known location of the reference point 42. The difference between the known and calculated locations of the differential station 40 and its reference point 42 are taken to provide a differential correction. The differential correction is transmitted via a transmission line (or cellular phone) 36c to a telephone network 34 and therefrom via a line 36d to the command center 38. The command center 38 may alternatively transmit the differential correction via line 36B, the telephone network 34 and the mobile telephone system 22 to the vehicle tracking unit 14, which uses the differential correction to improve the accuracy of the calculations made by the unit 14 of the vehicle's location. As will be explained below, the command center 38 uses the calculations whether made at the remote vehicle tracking unit 14 or at the center 38 itself, to provide a display of the vehicle location upon a background of a digitized, detailed map. An operator at the command center 38 may guide authorities to the vehicle 16 based upon the displayed information. If such information were desired at a location remote from the command center, a substation 46 is coupled via transmission line 36e to the telephone network 34 and by telephone line 36f to the command center 38 to receive repetitively transmitted data of the vehicle location and to display at the remote substation 46 the vehicle location.

Figure 2A:
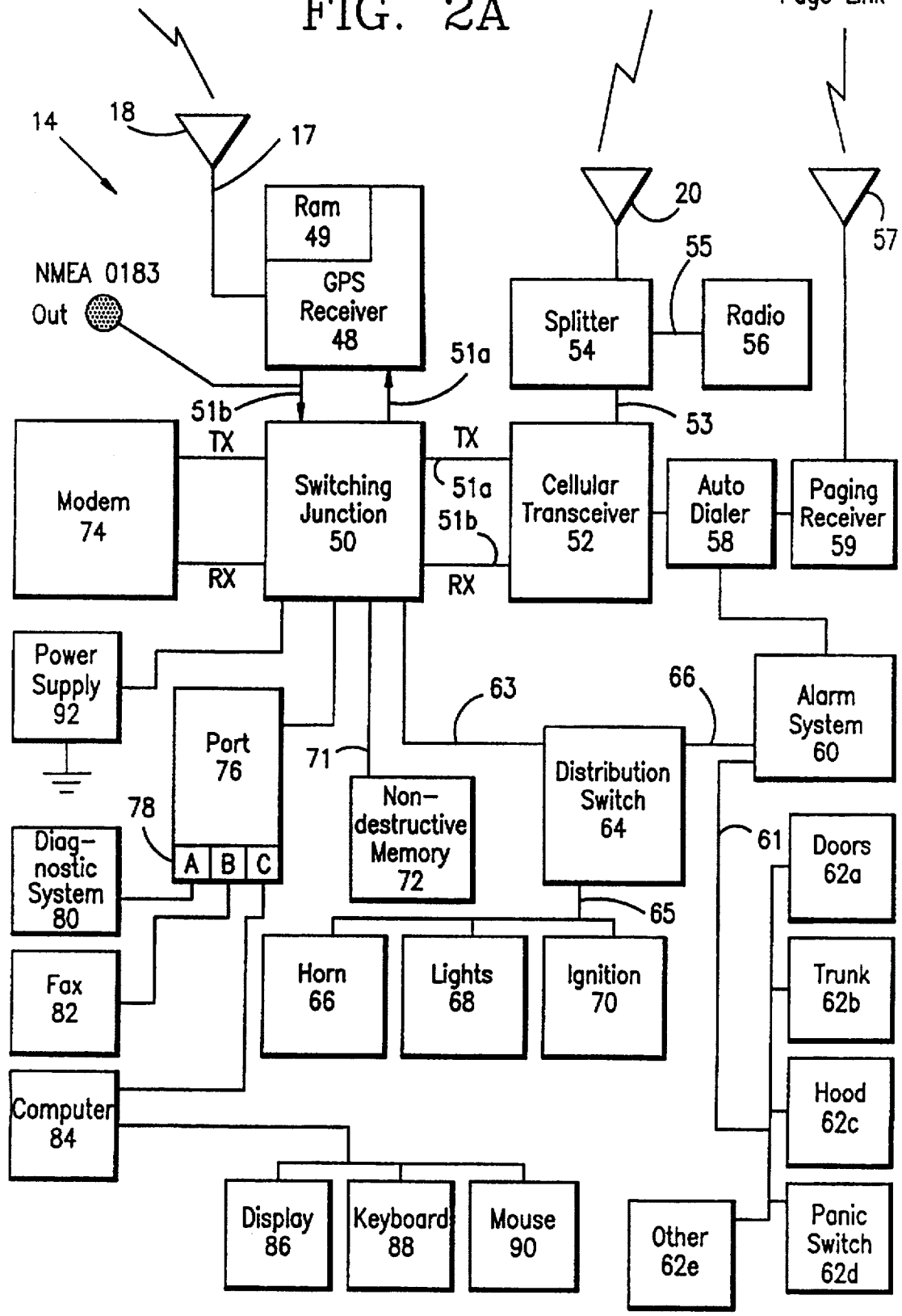
FIGS. 2A, B, C, D, E and F are respectively a more detailed functional block diagram of the vehicle tracking unit incorporated within the system of FIG. 1A, a plan view of an antenna coupled to the GPS receiver shown in FIG. 2A, a detailed functional block diagram of the GPS receiver included in the vehicle tracking unit of FIG. 2A, a plan view and a cross-sectional view of the vehicle's roof showing how an antenna is embedded therein, and a top, plan view a pair of matched phase antennas, which are mounted respectively on the front and rear windshields of the vehicle.

Referring now to FIG. 2A, the details of the vehicle tracking unit 14 will be explained. The primary components of the vehicle tracking unit 14 are its ground GPS receiver 48 for receiving and processing the GPS signals received from the satellites 12 via the coupled antenna 18 and a transceiver 52 for establishing two-way communication between the receiver 48 and the command center 38. The receiver 48 is in an illustrative embodiment of this invention adapted to receive and process GPS signals in that format established by the Department of Defense and described in "National Marine Electronics Association 0183, Standard for Interfacing Marine Electronic Devices, Version 2.00, Jan. 1, 1992"; such a ground GPS receiver 48 may take the form of that receiver manufactured by Ashtech under its Model "RANGER". Illustratively, such a receiver 48 is capable of outputting at least two sentences in the 0183 standard established by the National Marine Electronics Association. Those sentences are a block of the GPS Fix Data ($GPGGA) within the GGA address field and include the universal time coordinated (UTC) time, the north or south latitude, the east or west longitude, the number of satellites (either 3 or 4) participating in the fix, a data quality indicator describing the location or fix data (0 indicating an invalid fix, 1 indicating a valid GPS and 2 indicating a differential GPS fix), the number of satellites 12 whose signals were received to calculate the fix data, the horizontal dilution of precision (HDOP/3-SVs) or position dilution of precision data (PDOP/4-SVs), the altitude of the antenna above mean sea level, the ellipsoid separation between satellites 12, the time (or age) expressed in seconds that the present differential GPS correction data has not changed, and an identifier indicating which of the plurality of potentially available differential stations 40 was involved in providing the differential correction data. The receiver output may also include another block which is identified by the $GPVTG (Vehicle Track made Good) address field and includes the direction that the vehicle 16 is moving in degrees with regard to true north and to magnetic north, the vehicle speed expressed in knots and the vehicle speed expressed in kilometers per hour. Differential correction data is transmitted by the transceiver 52 to an RS-232 port of the GPS receiver 48. The GPS receiver 48 receives the satellite signals and the differential correction data to calculate as will be described in detail below repetitively at regular intervals, e.g., 1 second, a series of signals indicative of the accurate location of the object or vehicle 16. In turn, the receiver 48 calculates the distance between successive points and then the vehicle speed based on this calculated distance divided by the time period. The receiver 48 also calculates based on the values of latitude and longitude of successive points a vector between the successive points and, thus, the direction in which the vehicle 16 is travelling. The receiver 48 of a vehicle tracking unit 14 may be prompted by a message transmitted from the command center 38 to provide a return message bearing an indication of the vehicle location, speed and direction of movement. In addition, the GPS receiver 48 includes a DC power port and a receiver antenna port.

Figure 2B:
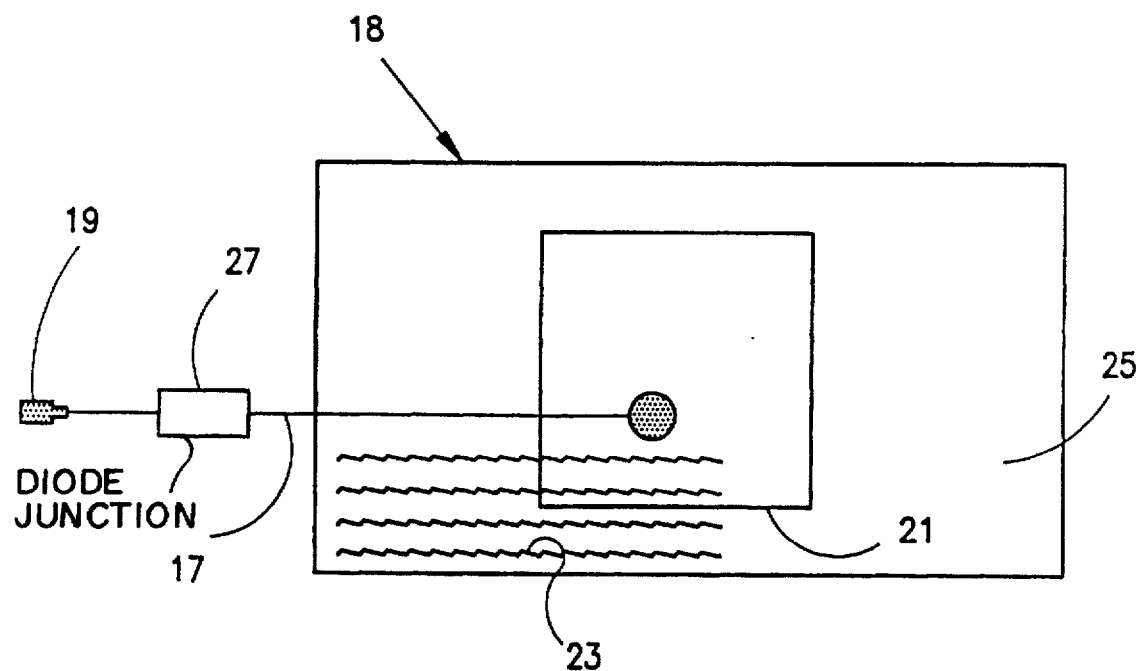
Figure 2C:
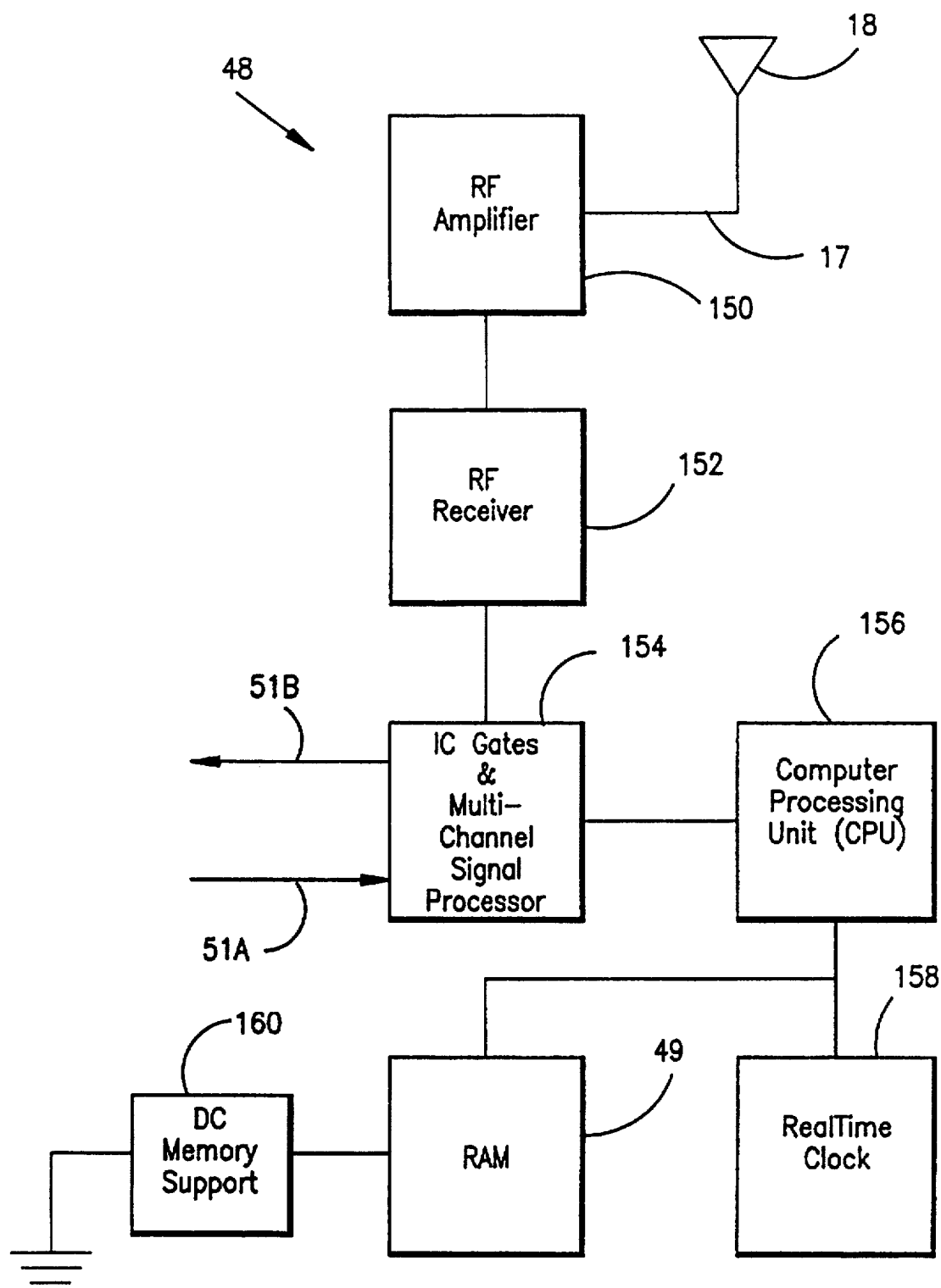

Referring now to FIG. 2C, there is further shown the components of the GPS receiver, which is described above with respect to FIG. 2A. GPS signals are sensed by the antenna 18 and are applied by line 17 to an RF amplifier 150. The RF amplifier 150 amplifies and applies these signals to an RF receiver 152. Illustratively, the GPS receiver 48 is a 5-channel receiver, which is capable of simultaneously processing GPS signals from 5 different satellites 12 at one time. A processor circuit 154 comprises the IC gates and multi-channel signal processor for handling the GPS signals from the plurality of satellites 12, which are applied thereto from the RF receiver 152. The processor circuit 154 also includes an input port 51a and output port 51b, whereby data is transmitted respectively to and from the GPS receiver 48 from the other components of the vehicle tracking unit 14. The GPS receiver further includes a random access memory (RAM) 49 and a realtime clock 158. The RAM 49 stores the almanac and ephemeris data, which is used as explained above to calculate the location of the vehicle tracking unit 14 and its vehicle 16 and, in particular, to identify which satellites will be in view of this vehicle tracking unit 14 and to calculate the present orbital positions and coarses of those satellites 12. The RAM 49 also stores the location data, which is calculated from the received GPS signals. A backup voltage supply 160 is coupled to the RAM 49 to prevent memory loss even in the event of main power failure. The GPS receiver 48 further includes a computer processing unit (CPU) 156, which executes programs and processes data stored in the RAM 49. In particular, the CPU 156 synchronizes the realtime clock 158 with the atomic clock of one of the satellites 12, processes the GPS signals to provide the vehicle location data and processes differential correction data, as will be explained, to provide location data of even greater accuracy. The CPU 156 also executes, as will be explained below with respect to FIG. 7, a reacquisition program 298, which is stored in the RAM 49, for reinitializing the GPS receiver 48 after the GPS signals have been lost and subsequently regained or after restoration power to the GPS receiver 48.

The receiver 48 is interconnected to the remaining elements of the vehicle tracking unit 14 via a switching junction 50, which may illustratively take the form of a hard wired switch providing inputs to and outputs from the receiver 48. The switching junction 50 interconnects the receiver 48 through a modem 74 to the cellular transceiver 52 for formatting the telephone signals transmitted and received over lines 51a and 51b respectively. The switching junction 50 also connects the GPS receiver 48 to a distribution switch 64, which is in turn connected to an alarm system 60 via line 66 and via line 65 to various vehicle components such as a horn 66, lights 68 and an ignition 70. The switching junction 50, the distribution switch 64, the non-destructive memory 72, the port 76, and a power supply 92 are mounted on a separate circuit board, which generates power and provides means for interconnection with all elements of the vehicle tracking unit 14. The alarm system 60 senses entry by an unauthorized person and/or theft of the vehicle 16. Illustratively, sensors are disposed in the vehicles door 62a, the trunk lid 62b, the hood lid 62c, a panic switch 62d or other devices 62e. These sensors may take the form of a mercury, magnetic, wire, heat sensor or other activation device. When closed, these devices trigger the alarm system 60 to initiate operation of an auto dialer 58, which dials a known number of the command center 38 and transmits a "burglary in process" message to the command center 38. The panic switch 62d is inconspicuously located in the vehicle to be accessible to the vehicle operator. If the operator should sense that the vehicle 16 is about to be carjacked, he or she will activate the panic switch 62d and cause the auto dialer 58 to send the "burglary in process" message to the command center 38 thus enabling rapid assistance by the police. The vehicle tracking unit 14 further includes a non-destructive memory 72, which stores an ID to identify the vehicle 16 and/or its owner. When initiated by the alarm system 60, the auto dialer 58 accesses via the switching junction 50 the non-destructive memory 72 to insert the stored ID in its message transmitted to the command center 38.

The transceiver 52 is coupled via a suitable coaxial cable 53 and an AM-FM/cellular splitter 54 to a dual purpose antenna 20, which functions to receive and transmit data messages to and from its cell 24 of the mobile telephone system 22. The splitter 54 also couples the antenna 20 to the AM-FM radio 56 via line 55. The transceiver 52 is also connected by line 51a, the switching junction 50, line 63, the distribution switch 64 and line 65 to each of the vehicle's horn 66, lights 68 and ignition 70. When a theft is detected, an operator at the command center 38 responds to the "burglary in process" message by transmitting a return message via the telephone network 34 and the mobile telephone system 22 to the transceiver 52 of that vehicle 16, to actuate the distribution switch 64, whereby either or both of the horn or lights are energized and the ignition 70 deactivated. The actuation of the horn 66 and/or lights 68 alerts the police that this vehicle 16 has been stolen. Depending upon the traffic conditions, it may be appropriate and safe to disable the ignition 70, whereby the stolen vehicle 16 is rendered inoperative and brought to a halt.

In an illustrative embodiment of this invention, the mobile telephone system 22 is implemented by cellular telephone technology, which is intended primarily for voice communications. Each cell 24 comprises a plurality of channels, each of which is dedicated to duplex voice communication. There exists between adjacent voice channels, a relatively narrow space or bandwidth, which is utilized in accordance with this invention for the transmission of data packets bidirectionally between the transceiver 52 of each vehicle tracking unit 14 and the central station 28. Illustratively, there would be included a switching network comprising several nodes through which a data message is initiated at a specific node. Illustratively, the data message would include a start-of-header preamble, a start-of-text command, the message text in the form of the vehicle location and time data, and an end-of-text suffix. The switching network routes the packet of data to its destination node.

A power supply 92, which may illustratively take the form of a 12 volt DC battery, is coupled via the switching junction 50 to all of the elements of the vehicle tracking unit 14. When the ignition 70 is turned on, an appropriate signal is applied to the switching junction 50, whereby the power supply is enabled to fully energize all of the elements of the vehicle tracking unit 14. When the ignition 70 is turned off, the switching junction 50 operates in a battery saving standby-on mode, wherein the transceiver 52 remains energized at that minimum level to permit reception of a message from the command center 38 inquiring as to the present location of the vehicle 16. The vehicle tracking unit 14 responds to such an inquiry by accessing a memory and, in particular, a random access memory (RAM) 49 of the receiver 48 to obtain and transmit a message indicative of the present location of the vehicle 16 to the command center 38.

The receiver 48 is also coupled via the switching junction 50 to an RS-232 port 76 and a 3-way switch 78. The switch 78 is in turn optionally coupled to a diagnostic system 80, a facsimile 82 and a computer 84. The use of the port 76 and the switch 78 permits the vehicle operator to communicate from his or her vehicle 16 to remote locations via the mobile telephone system 22 and the telephone network 34. The diagnostic system 80 is used to check the functions of the vehicle tracking unit 14. The computer 84 is loaded with mapping data, which permits the location calculated by the GPS receiver to be displayed against the background of a street level map on a suitable display 86. Thus, the vehicle operator is informed in real time of the exact location of his or her vehicle 16. The computer 84 is also coupled to a keyboard 86 and a track ball, cursor, or mouse 90, whereby map data of a particular geographical area may be accessed and the vehicle's location against a map background is superimposed on the display 86. The mouse, cursor, or track ball 90 may be mounted conveniently to the driver on the steering wheel, dash or console. The vehicle operator may use such a display to proceed to a desired destination.

The vehicle tracking unit 14 is contained within a housing, which is intended to withstand a vibration and shock environment, which is contemplated by mounting within the vehicle 16. For example, the housing of the vehicle tracking unit 14 may be made of aluminum and its various circuit boards for supporting the components of FIG. 2, may be shocked mounted within the housing. This housing typically is mounted in an obscure location within the interior of the vehicle 16 so that a potential thief would not anticipate that the vehicle's theft will be immediately brought to the attention of the authorities and, therefore, attempt to disable the vehicle tracking unit 14.

To further conceal the existence of the vehicle tracking unit 14, the antenna 18 coupled with the receiver 48 is disguised as shown in FIG. 2B. The antenna 18 is capable of providing omni-directional and circular coverage to permit reception of the satellite signals regardless of the orientation of the vehicle 16. The antenna 18 as shown in FIG. 2A as a parking sticker or vehicle inspection sticker. Illustratively, the antenna may comprise a relatively thin, square or circular piece 21 of a foil or metallic strip, which has a configuration and dimensions set to tune the appropriate L-Band GPS frequency and is right-hand circularly polarized. If the piece 21 is configured to be square, its diagonal is 1.782 inches to receive L-Band signal. If the piece 21 is circular, then its diameter is set to be 1.782 inches. The metallic piece 21 is embedded between a pair of clear, insulating sheets 25 and coupled by a cable 17 to a terminal 19, which is adapted to be coupled to the port of the receiver 48. The insulating sheets 25 may be illustratively made of plastic, paper, fiberglass or other synthetic material.

Illustratively, the antenna 18 may be placed upon the window or alternatively, an antenna 18' may be embedded into the exterior surface of the car, e.g., the roof 19, the trunk lid, the engine lid, hood lid, the rearview mirror, etc. In a preferred embodiment, the antenna 18' as shown in FIGS. 2D and E is designed inconspicuously as a radome and embedded within an opening 23 of a like dimension and configuration in a rooftop 19 of the vehicle 16. Such design would hide the GPS receiver's antenna 18' and, with slight modifications, could hide other antennas, which may be used in various other applications. In this radome design, the antenna's flat upper surface is nearly flush with the vehicle's rooftop. (Although such a mounting could be achieved by embedding in the engine hood or truck lid, optimal receptivity could not be facilitated because of signal blockage caused by the roof). A fiberglass or other non-conductive composite would be molded around the antenna 18' to form the basic radome and would serve a double purpose, first the side molding would insulate the antenna from the harmful effects of the metal comprising the rooftop. Second, the side molding would enable satellites with lower mask angles to be received without signal degradation that might otherwise be caused by reflections off of the conductive rooftop. The minimum distance D between the periphery of the piece 21 and the periphery of the whole antenna 18 is set to be half the wave length of the received signal, e.g., 3.74 inches. The entire radome would be painted with a non-metallic paint that when applied, would conceal completely the GPS antenna 18'.

Figure 2F:
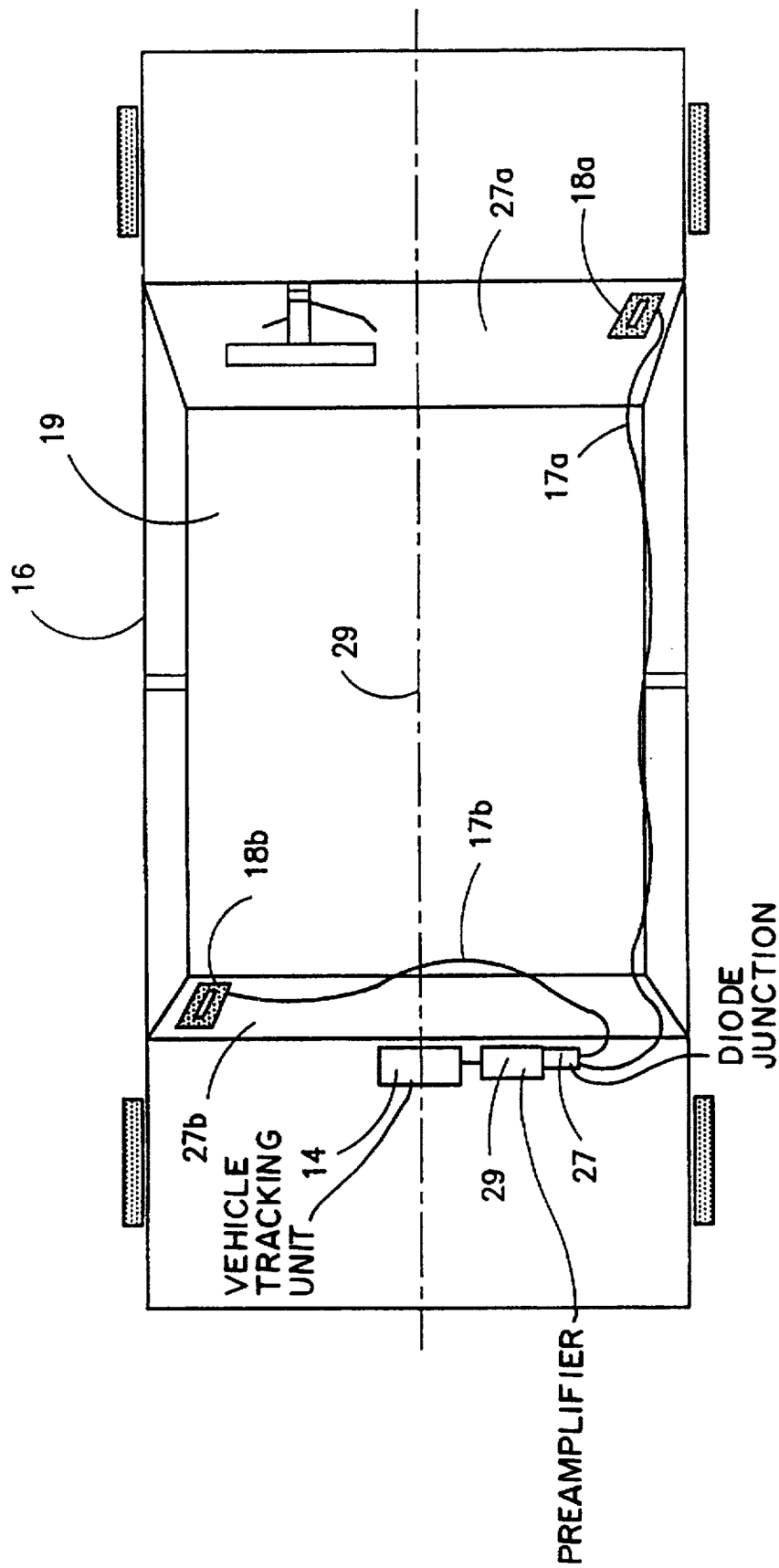

Another method of inconspicuously mounting an antenna would be to embed it in the windshield as shown in FIG. 2F. Because an antenna 18a disposed on a front window 27a would be slanted forward (with respect to the horizontal plane), satellite signals favoring the rear of the vehicle 16 would not be received as strongly, and thus, a second antenna 18 may be disposed on a rear window 27b and be balanced and in phase with the first antenna 18a by carefully ensuring that the lengths of each of the coaxial cables 17a and b are identical. An added benefit to employment of two 180-degree opposed slanted antennas 18a and b, such as described here, is that better utilization of satellites positioned at lower mask angles to the horizonal plane could be facilitated especially in city environments where a single vehicle's GPS antenna 18 would be obscured by tall structures to its right and left. Fore and aft satellites that may not be selected for a fix because of their insufficient strength may now be selected occasionally as a result of the windshield antenna angle and, hence, more perpendicular orientation towards such satellites. Further, the antenna 18a is placed on the passenger side of the front windshield 27a, whereas the antenna 18b is disposed on the driver side of the rear windshield 27b. First, if an unauthorized person enters and drives the car, he or she will normally sit in the driver's seat at a distance from the antenna 18a; thus, the unauthorized driver will be less likely to observe the connection of the coaxial cable 17a to the antenna 18a. Second, the windshields 27a and 27b are typically curved (not shown in FIG. 2F) to permit their respective antennas 18a and b to observe different sectors of the sky offset in opposite directions from a front-to-back axis 29 of the vehicle 16. Further, in order to avoid the mutual inductance of corruptive signals into one another, the balanced, dual-phased antennas 18a and b would first join at a diode junction 27, which is coupled via a preampilifer 29 to the GPS receiver 48. The diode junction 27 uses a diode for each of the antennas 18a and b to back bias and thereby prevent the signal from one of the balanced, dual phase antennas 18a and b from being applied to the other. Signal losses would be restored in all antenna designs of this invention by an RF signal-triggered preamplifier 29 which in turn would be connected to the GPS receiver 48. The sticker antenna 18 and the rooftop embedded antennas 18' could also be dual-phased under this design if the mounting configuration warranted.

In an embodiment where the vehicle tracking unit 14 is adapted to track a person, such an antenna 18 may be inconspicuously embedded in the upper portion of clothing, hats, helmets, briefcases, backpacks or luggage to facilitate portable operation. Referring now to FIG. 3, the details of the structure and operation of the command center 38 will now be explained. Data signals from a plurality of the vehicle tracking units 14 are transmitted via the mobile telephone system 22, line 36a and the telephone network 34, as shown in FIG. 3, to the command center 38 and, in particular, to a conventional switchboard 94. Differential correction information is transmitted over a line 36c from the differential station 40, and user requests from substation 46 are transmitted via line 36e and the telephone network 34 to the command center 38. The switchboard 94 comprises an A partition 94a including a first plurality of lines for handling the data from a potentially large number of vehicle tracking units 14, and a B partition 94b for primarily communicating voice messages from customers at the substation 46 and for transmitting data back to their substations 46. The A partition 94a is coupled to a queuing terminal 90, which stores or queues in the order that the data messages were received from the plurality of vehicle tracking units 14, until the message may be further processed. A patch panel 92 is coupled to the terminal 90 and to a plurality of modems 98a–c whereby a like number of updated messages may be handled at one time. As will be explained, the patch panel 92 permits the command center 38 to be coupled via a first data link to particular vehicle tracking unit 14 and via a second link to a differential station 40. In turn, the modems 98a–c are coupled in parallel to a multiplexer 100 having a like number of channels. In effect, the multiplexer 100 sequentially accesses each channel and each of the modems 98a–c and applies that data via a line 101 to a tracking computer 102. The multiplexer 100 may be a time division or digital type of multiplexer. Illustratively, the tracking computer 102 comprises at least two serial ports to permit the handling of data from at least two or more vehicle tracking units 14 in the event a multiplexer is not used. Though the conduit 101 coupling the multiplexer to the tracking computer 102 is illustrated as but a single line, it is appreciated that the conduit 101 would include plural electrical paths.

The primary purpose of the tracking computer 102 is to drive a coupled display in the form of a CRT 108 with a map of the location of the vehicle tracking unit 14 and a point disposed on the displayed map indicating the relative position of the vehicle tracking unit 14. To that end, geographic information is stored in a memory 110 and is accessed by the tracking computer 102 dependent upon the present, calculated location of the vehicle tracking unit 14. Such geographic information is described in, *Geo Info Systems*, April 1992, Pg. 31, entitled "Dynamic Pilot Project," by Brusegard, and may include street-level maps of a given geographic region. The multiplexer 100 permits a plurality of dots corresponding to the locations of a like plurality of vehicles 16 to be displayed on the single display CRT 108. The multiplexer 100 serially applies signals received through the like plurality of modems 98 from each of the plurality of vehicle tracking units 14 indicative of the present latitude and longitude of each of these vehicles to the tracking computer 102. Illustratively, such geographic information may be stored in a CD ROM 110a, a CD-I drive 110b, a hard drive 110c or a tape drive 110d. Input devices such as a mouse 104 and a keyboard 106 are associated with the tracking computer 102 and permit an operator to access from the memory 110 the mapping data of a particular vicinity or city, when it is known that a particular vehicle tracking unit 14 is in that area. Where a large geographic area is to be monitored, e.g., the United States, a large number of tracking computers 102 may be used, each computer 102 dedicated to tracking vehicles 16 in one portion of the large region. For example, one tracking 16 computer 102 would be assigned to track the vehicle tracking units 16 presently located within the state of Virginia. A plurality of the tracking computers 102 are coupled with the common memory 110 by a local area network (LAN) server 112 to permit each tracking computer 102 access to the memory 110. A high speed (laser) printer 114 and a plotter 116 are also coupled to the LAN server 112 to permit the map and vehicle tracking unit location data to be reduced to a hard copy, whereby the path of the monitored vehicle 16 may be readily observed. In addition, a test circuit 118 may be associated with an antenna 120 for receiving the GPS signals from the satellites 12, whereby the GPS signals may be observed to determine whether the satellites 12 are functioning correctly, the current pseudo-range value "n" and the expected degree of inaccuracy provided from the GPS signals. Further, an emergency power supply 126 is connected to all of the elements of the command center 38 to provide continuous power when normal power may fail.

Figure 5:
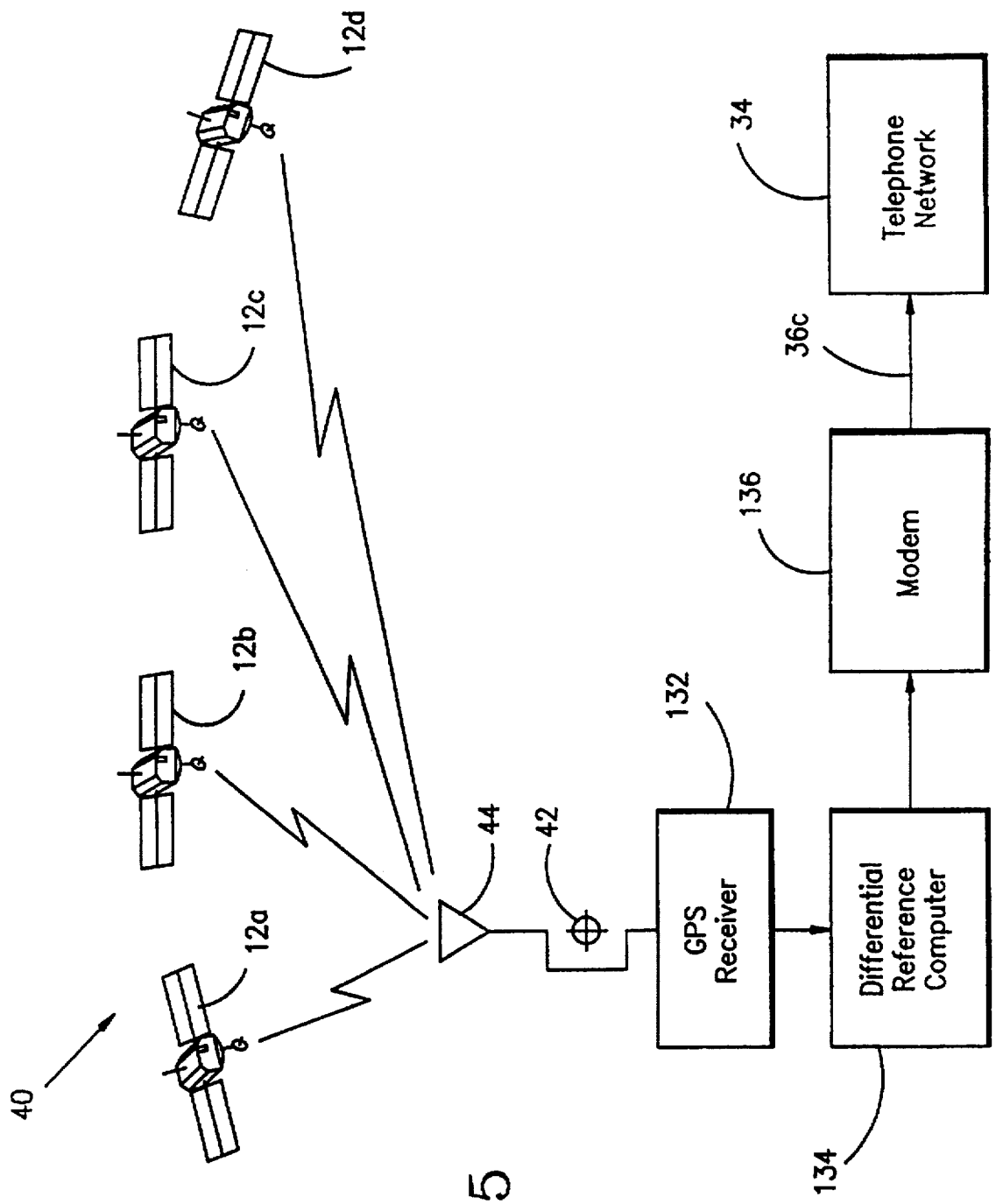
FIG. 5 is a functional block diagram of a differential station incorporated within the system of FIG. 1.

The differential station 40 described generally with respect to FIG. 1, will now be explained in greater detail with respect to FIG. 5. In particular, the differential station 40 comprises a GPS receiver 132 similar to that receiver 48 included within the vehicle tracking unit 14. The GPS receiver 132 is connected to the antenna 44 to receive GPS signals from each of the satellites 12a–c. To ensure greater precision, the antenna 44 is fixedly disposed over the reference point 42, whose latitude and longitude are known with a high degree accuracy. The GPS receiver 132 processes the satellite signals to calculate a location of the differential station 40 based upon well known triangulation techniques and to output a signal indicative of the calculated latitude and longitude of the differential station 40. That signal is applied to a differential reference computer 134, which compares the calculated latitude and longitude with the known latitude and longitude of the reference point 42, which are obtained by surveying. As will be described in detail later, the computer 34 obtains differential correction data by taking the difference between the calculated and known values of latitudes and longitudes. That differential correction data is in turn transmitted via a modem 136 and the line 36c to the telephone network 34, whereby the correction data is supplied to the command center 38. It is noted that a second differential computer 134' and associated GPS receiver 132' and differential modem 136', may be included within the command center 38 to supply differential correction data directly to the command center 38.

One or more substations 46 may be coupled to the command center 38 to permit operators of a fleet of vehicles 16 and others who would desire to keep track of one or more vehicles 16 to directly track upon their own display 108' vehicle movement, without otherwise communicating, e.g., by a telephone call, with the command center 38. The substation 46, as shown in further detail in FIG. 4, comprises a personal computer 102', which is coupled via a modem 142, the line 36e, the telephone network 34 and the line 36f to the command center 38. In a manner similar to that described with respect to the command center 38, the substation 46 also includes a memory 110' for storing the mapping data and suitable input devices such as a mouse 104' and a keyboard 106' to permit an operator to enter a request upon the substation computer 102', whereby a bidirectional transmission link with the command center 38 is established to permit an indication of the particular vehicles location in terms of corrected latitude and longitude to be transmitted to the substation 46 and in particular, to its substation computer 102'. The operator may also enter via the keyboard 106', a request to access from the memory 110' that map data of the area in which the vehicle 16 has been located. As described before, the map data and the location of the vehicle 16 are shown on the display 108', whereby the operator may readily identify the location of the vehicle 16 on the map and, in particular, the exact street address of where the vehicle 16 is currently located.

Figure 4:
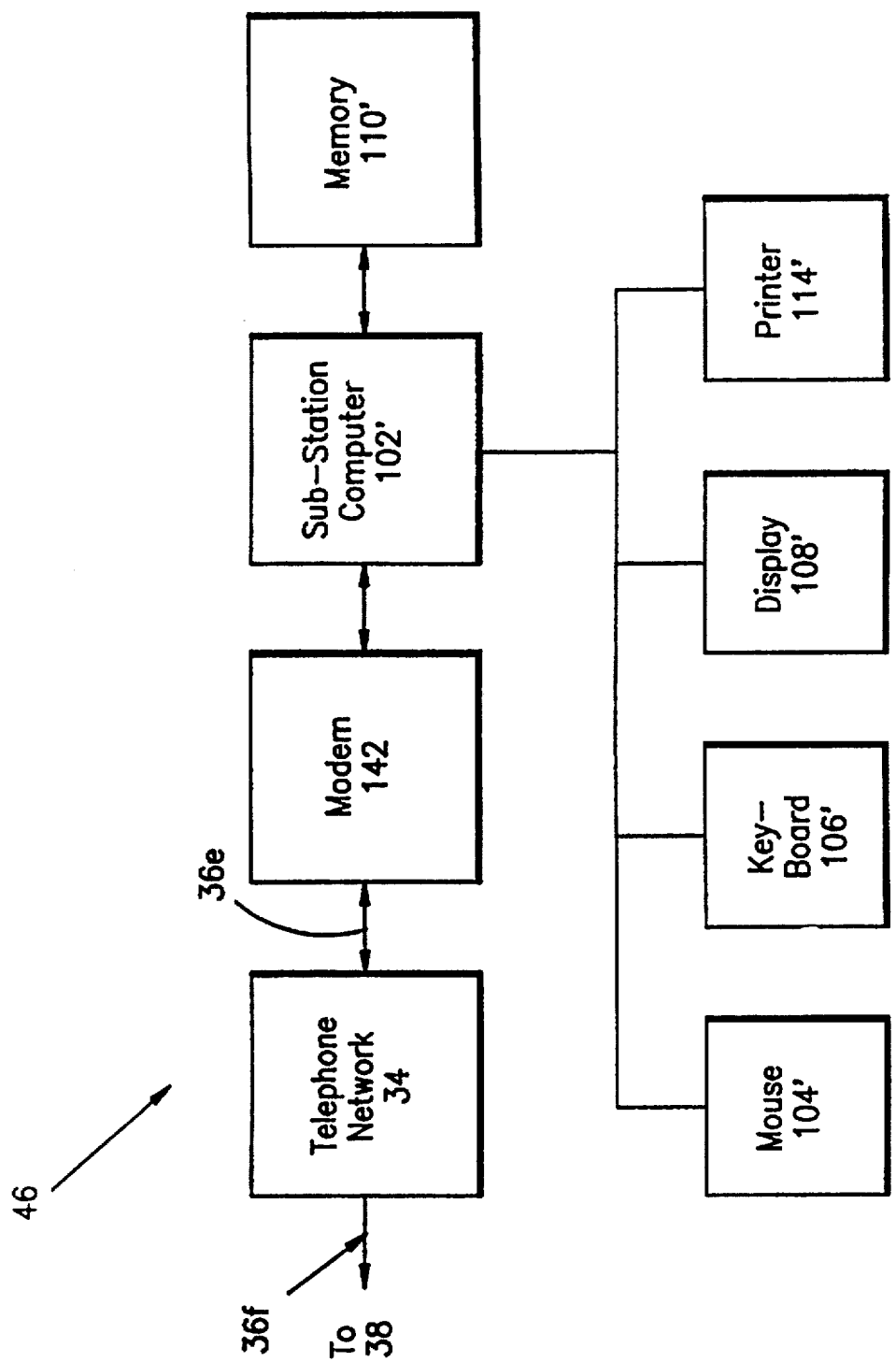
FIG. 4 is a functional block diagram of a substation incorporated within the system of FIG. 1.

It is also contemplated that the substation 46 will often request to concurrently monitor along with the command center 38 the tracked vehicle 16. Such dual monitoring capability would enhance coordination during a police chase where the vehicle 16 is being pursued. Accordingly, such a capability is integral within the design of the command center 38. Essentially, when the substation 46 desires simultaneous monitoring of a vehicle's 16 location, the substation 46 is connected to the command center via modem 142, the telephone network 34, and partition 94a of the switchboard 94 to the tracking computer 102. Once a full duplex path between the tracking computer 102 and the vehicle 16 is established, the demodulated signal from the vehicle 16 may be easily looped back to the substation 46, thus enabling concurrent monitoring operations at the command center 38 and the substation 46 for optimal coordination or dual logging of coordinate geography (COGO) for future analysis or retrieval. The apparatus of the command center 38 provided for establishing ready communication with one of the differential stations 40, also serves to establish communication with the substation 46. For example, the tracking computer 102 has two bi-directional ports, one port for receiving location data from a vehicle tracking unit 14 and differential correction data from the differential station 40, and another port for outputting the accurate calculation of vehicle location via the patch panel 92, the switchboard 94 and the telephone network 34 to the substation 46. As shown in FIG. 4, the map data is stored in the memory 110' for display upon the display 108' along with a dot indicating the accurate position of the vehicle 16.

It is also contemplated that the map data need not be stored locally at the substation 46 in its memory 110'. Rather map data of a particular location corresponding to that of the present location of the vehicle, may be downloaded via the open link between the substation 46 and the command center 38. In particular, the operator at the substation 46 enters a telephone number via the keyboard 106', a telephone number of the command center 38 and, in particular the B partition 94b of the switchboard 94, whereby a link between the substation 46, the modem bank 124, the LAN 112 and its mainframe computer 122 is established. The requesting message typically includes a password, which is checked by the computer 122 before access to the command center 28 is granted. The mainframe computer 122 permits concurrent communications with a plurality of the substations 38.

The operation of the position determining system 10 to track a particular object or vehicle 16, begins when a message is transmitted to the command center 38. In a first case, that message may originate when the vehicle tracking unit 14 responds to an unauthorized entry into the vehicle 16 or its operator actuates the panic button 62d. Then, the autodialer 58, as shown in FIG. 2A, initiates an alarm message to the command center 38. In a second case, a person may access the command center 38 either through normal telephone lines or from a substation 46 with a message, which includes an ID unique to a particular vehicle 16 and requests that the location of that vehicle 16 be tracked. The alarm message from the vehicle tracking unit 14 will also include an ID, which is derived from the non-destructive memory 72 and is embedded within the alarm message transmitted to the command center 38. In either case, the initiating message is applied to the mainframe computer 122, which accesses a memory therein using the ID as an address to read out a block of data identifying vehicle data. Such a data block may include the following:

Vehicle Owner: John H. Doe

Authorized Drivers: John, Mary and Alice Doe

Owner Address: 8476 Main Street Bonanza, Colo. 85787

Home Telephone: (858) 555-2329

Work Telephone: (858) 555-8457

Car Telephone: None

Tracking Telephone: (858) 555-4589

Description: Ford Taurus, 1991, 4-door, Blue w/gray interior

Unique Identifier: Sticker, "UCLA," rear window

License Number: HGR-847, Colorado

Serial Number: T9084-4707-290873DG

Local Police: (858) 555-9090, Bonanza City Police

Figure 1B:
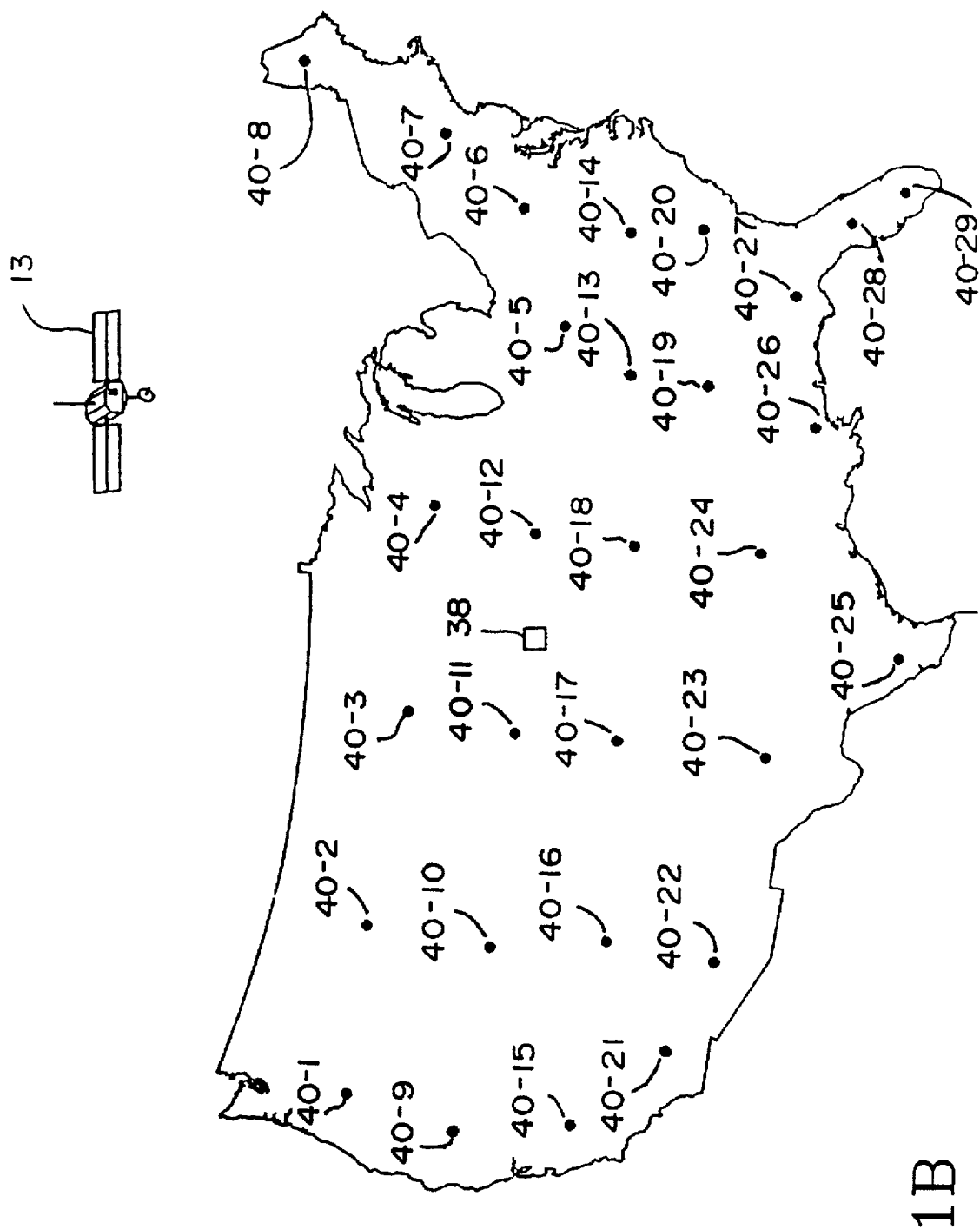

In the second case where the initial request message came from a substation 46, the mainframe computer 122 automatically places a telephone call to the transceiver 52 of the vehicle tracking unit 14, whereby a data link between the addressed transceiver 52 of a vehicle tracking unit 14 and the command center 38 is established. The mainframe computer 122 and, in particular, its patch panel 92 causes a second data link to be established from the command center 38 to a selected one of plurality of available differential stations 40. It is contemplated that a single command center 38 will serve a relatively large geographic area, e.g., the United States. However, vehicle tracking units 14 in different parts of the country will see different satellites in its sky. In order to use differential correction, the vehicle tracking unit 14 and the differential station 40 providing differential correction data to that vehicle tracking unit 14 must receive GPS signals from the same set of satellites 12; otherwise, the tracking unit 14 and differential station 40 will be synchronized to different atomic clocks of different satellites 12. Thus, it is necessary to have a differential station 40 located within approximately 500 miles of the vehicle 16 and it's vehicle tracking unit 14, which is to be tracked. Thus, if it is desired to track objects or vehicles 16 over a relatively large area, i.e., and are having at least one dimension greater than 500 miles, it is necessary to provide a plurality of differential stations 40, which are distributed in a pattern to ensure that a vehicle 16 traveling through the area will be within at least 500 miles of a differential station 40. FIG. 1B shows a map of such a large area, e.g., the United States, and the distribution of differential stations in a grid-like pattern of the differential stations 40. It is contemplated that it would require some 30 differential stations to cover the United States. The positioning determining system requires only a single command center 38, which can be located anywhere in the covered area. It is preferred to dispose the command center 38 centrally of the covered area to reduce the costs of transmitting between the command center 38 and each of the vehicle tracking units 14 and the differential stations 40.

Thus, the alarm message first transmitted from the vehicle tracking unit 14 must bear an indication of the approximate location of that vehicle 16, so that the command center 38 and, in particular its mainframe computer 122, may identify that differential station 40, which is closest to the vehicle 16 to be tracked. Upon identifying that particular differential station 40 and it's telephone number, a data link between the command center 38 and the closest differential station 40 is established via the dedicated link 36d, the telephone network 34, and the dedicated link 36c. In particular, the differential computer 122 accesses the particular telephone number of the nearest differential station 40 and causes the switchboard 94 to place the telephone call to that differential station 40. After establishing a data link between the nearest differential station 40 and command center 38, the differential computer 134, transmits in one illustrative method of operation of this invention differential correction data via the established data link to the vehicle tracking unit 14 to be tracked and in particular, via its transceiver 52 to the GPS receiver 48 of the vehicle tracked, whereby the received differential data may be patched via the patch panel 92 of the command center 92 and fed to the second DV-9 port 51 of the GPS receiver 48. In turn, the GPS receiver 48 adds or subtracts the differential correction data to both the latitude and longitude data calculated from the satellites signals and retransmits the corrected location data back to the command center 38. Thus, the corrected data may be displayed upon that CRT 108 at the command center 38 and/or the CRT 108' at the substation 46. The accuracy of the location displayed upon a CRT 108 or 108' is improved, when differential correction data is used in the calculation of the vehicle location. It is not unusual that an uncorrected object location would have a 100 meter error. If a vehicle location point were displayed upon a map, it would mean that the 100 meter error could displace the vehicle location some two or three blocks from it's true location. The use of the differential correction data as contemplated by this invention ensures a nominal accuracy of some two to five meters, which ensures that the vehicle data location will be correctly projected on to at least the correct street of the displayed map.

In the second case, an operator at the substation 46, enters via the keyboard 106' the trunk phone number of the B partition 94b of the switchboard 94, which is associated with the mainframe computer 122 of the command center 38. In addition, the substation 46 user needs to enter a password, which would permit entry into the command center 38. The mainframe computer 122 transmits through the established data link between the switchboard 94 and the substation computer 102' a menu of services to be displayed upon the CRT 108'. Typically, the menu includes a call support to enable the substation operator to call via the command center 38 a vehicle 16 equipped with the vehicle tracking unit 14, a listing of cellular roamer numbers throughout the country, a listing of the street-level mapping for most of the United States and of major Canadian metropolitan areas, the condition of the GPS satellites 12 and a bulletin board of general subjects concerning the GPS and the tracking industry. The substation operator can access any of this data using the substation keyboard 106'. It is also contemplated, that the tracking of a particular vehicle 16 may be displayed both upon the CRT 108' at the substation 46 as well as the CRT 108 at the command center 38.

Figure 6A:
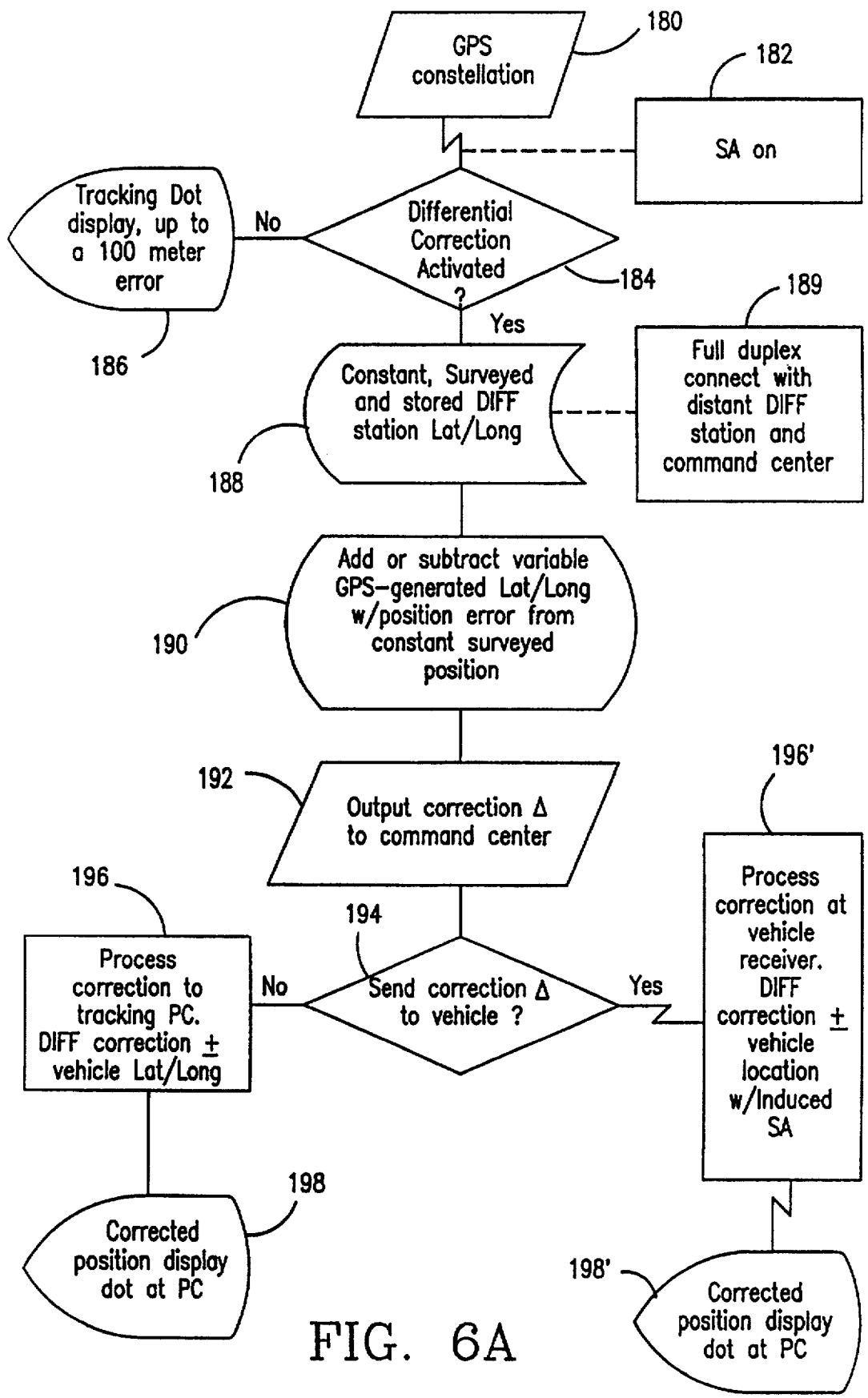
FIGS. 6A and 6B, C and D are respectively an overall and a detailed flow diagram of the operation of the entire system and method of FIG. 1.

Referring now to FIG. 6A, the operation of the position determining system 10 will be described further. Initially, step 180 indicates that the GPS satellites 12 are positioned in their orbits and are transmitting GPS signals therefrom. Step 182 contemplates that the Department of Defense has enabled Selected Availability, whereby the pseudo-range "n" is varied to distort the accuracy of any calculations of object latitude and longitude based upon the effected satellite signals. If Selective Availability has been turned on, the system 10 employs differential correction. If differential correction has not been activated, the displayed point location of the object may reflect an error potentially of some 100 meters. If differential correction has been activated, the differential correction data is employed, hence reducing the effects of not only Selective Availability, but also dilution of precision. The differential station 40 initially, as shown in step 188, determines the precise latitude and longitude of the surveyed point 42 associated with the differential station 40. Next in step 190, the differential correction data is provided by adding or subtracting the values of latitude and longitude based upon processing of the received GPS signals with the known surveyed values of latitude and longitude of the reference point. Next, the differential station 40 outputs the differential correction data to the command center 38. This invention contemplates as shown in step 194, that the differential correction data may be transmitted either to the vehicle tracking unit 14 or to the command center 38 for use. When it is desired to keep track of the vehicle 16 at the command center 38, the uncorrected values of the vehicle location are transmitted from the vehicle tracking unit 14 to the command center 38 and in particular to the tracking computer 102. As described above, after the data link is established between the command center 38 and the differential station 40, the differential correction data is also supplied to the tracking computer 102, which adds or subtracts the differential correction data with the uncorrected position data to display upon its CRT 108 the corrected point data. However, if it is desired to provide the corrected data to the object or vehicle 16, the differential correction data is transmitted to the vehicle tracking unit 14, whose GPS receiver 48 combines the uncorrected location data and the differential correction data to provide an accurate indication of the vehicle location.

Figure 6B:
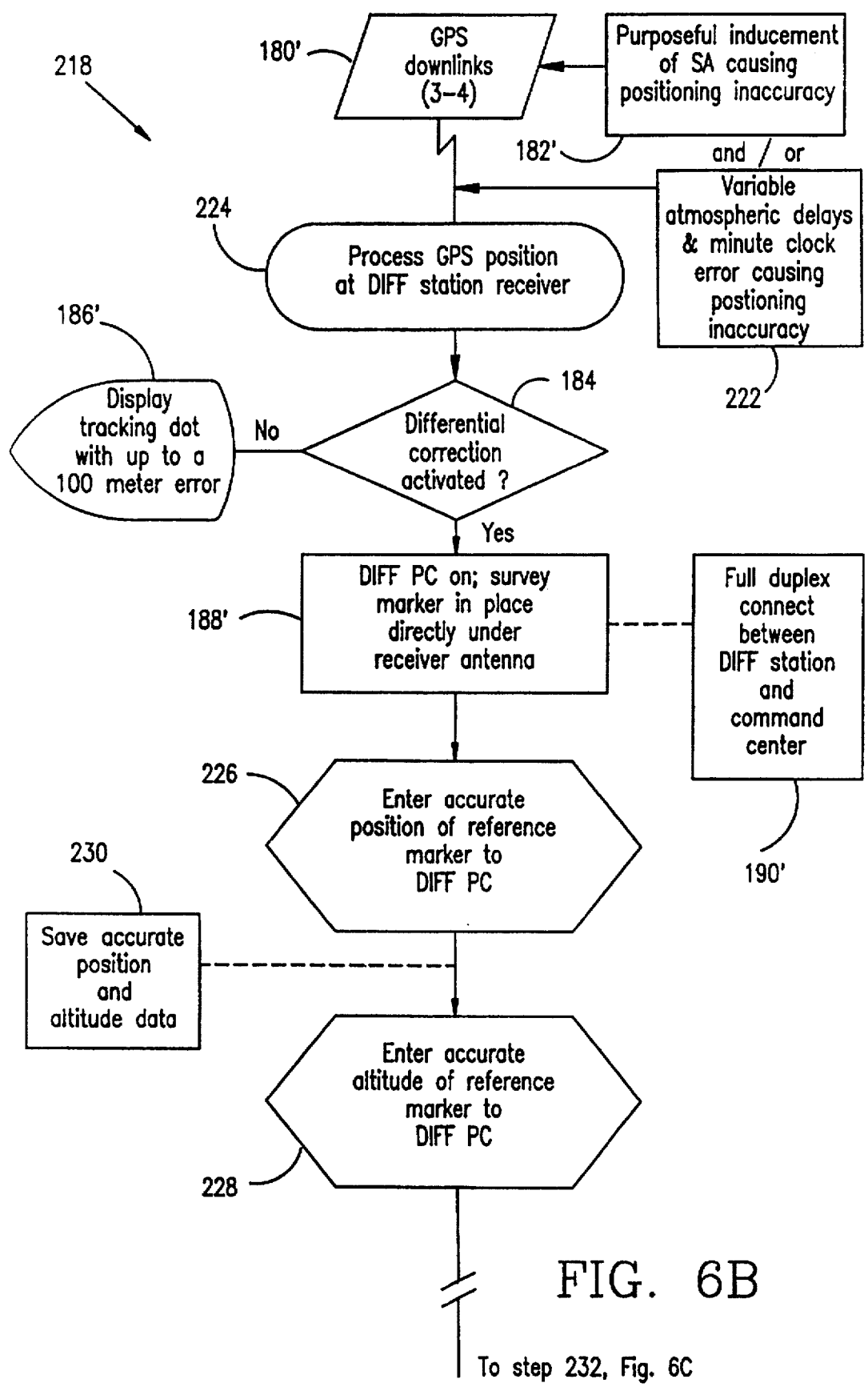
Figure 6C:
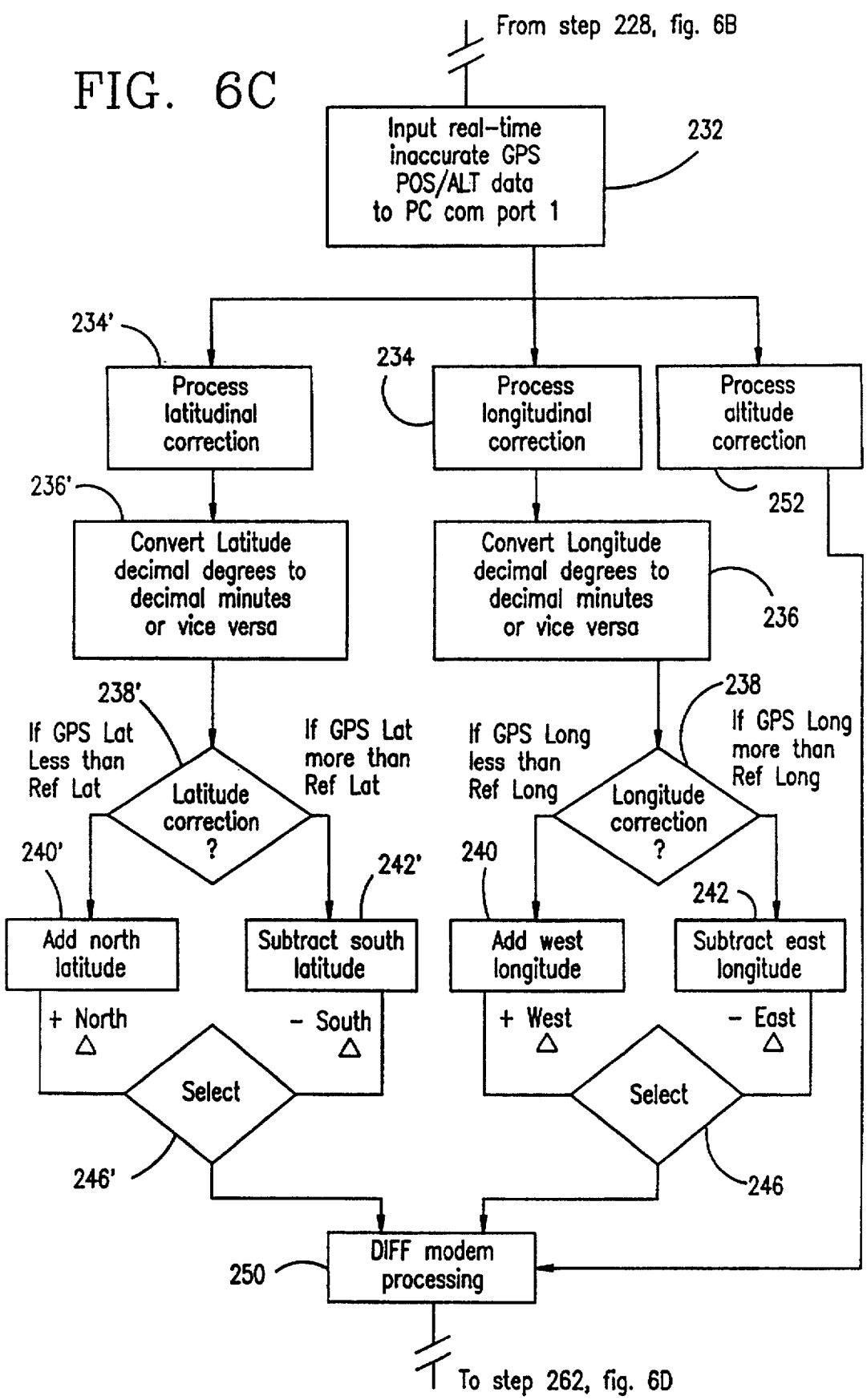
Figure 6D:
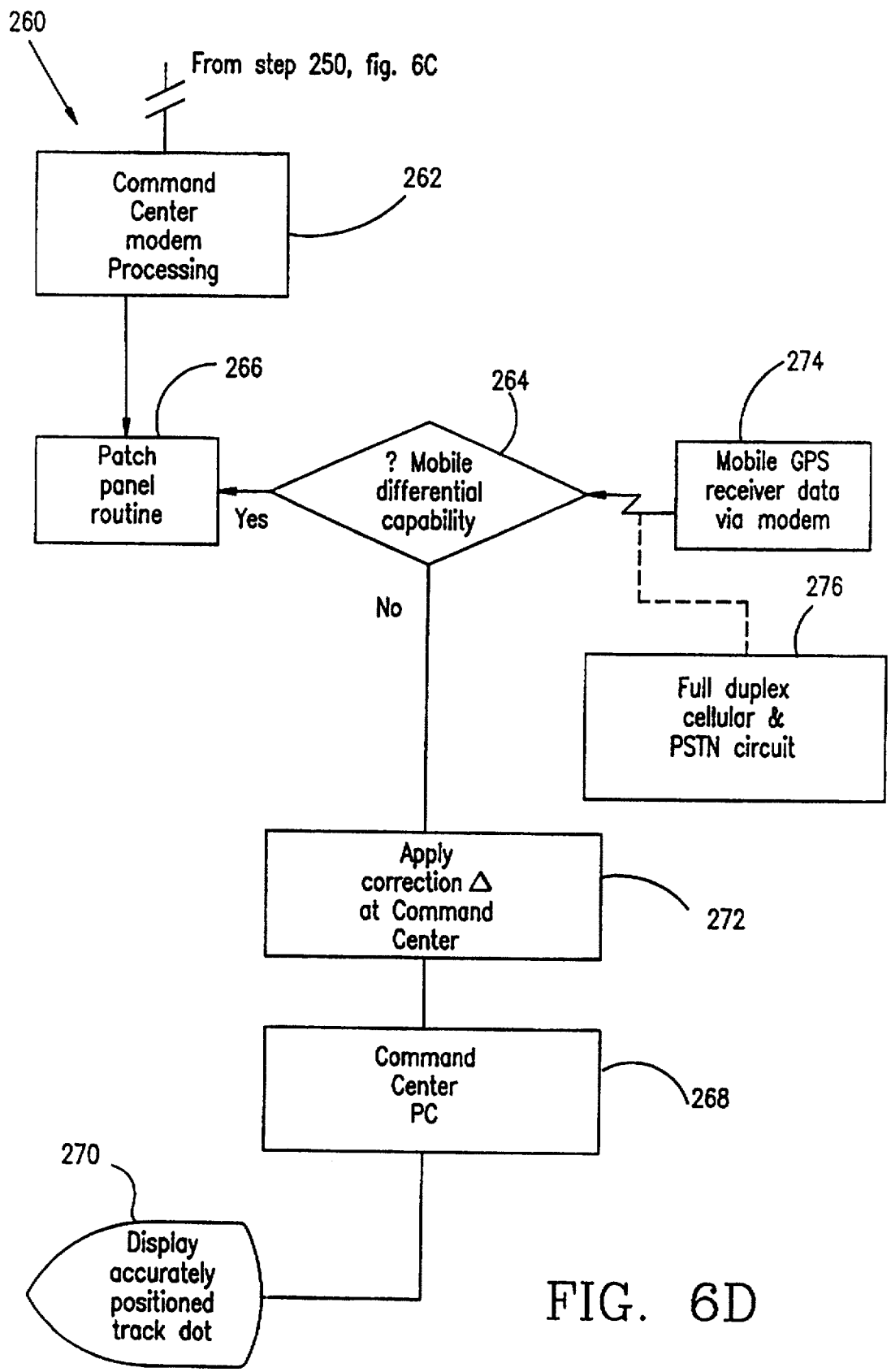

Referring now to FIG. 6B, the overall operation of the position determining system 10 will be explained in greater detail with respect to the flow diagram 218 of FIG. 6B. GPS signals are transmitted from the three or four satellites to be received and processed by the ground GPS receiver 48 of the vehicle tracking unit 14. Dilution of precision occurs if the pseudo-range "n" is increased by the Department of Defense when it activates its unscheduled program of Selective Availability, as indicated in step 182'. Precision is also lost, as indicated in step 222, by other factors including atmospheric delays, and clock errors. In step 224, the ground GPS receiver 48 provides an output indicative of the location of the vehicle 16 in terms of its latitude and longitude. If differential correction has not been activated as decided in step 184', the calculated location of the vehicle 16 is displayed with an error typically in the order of 100 meters. If differential correction has been activated, the differential computer 134 at the differential station 40 is turned on in step 188' and a full duplex connection between the differential station 40 and the command center 38 is established in step 190'. As indicated above, the antenna 44 of the differential station 40 is disposed precisely over the reference point 42, whose latitude and longitude are known with great accuracy and are entered by step 226 into the differential computer 134 as a mathematic constant. If the altitude of the object is also to be tracked, the altitude of the referenced point 42 is accurately measured in step 230 and is entered into the differential computer 134 as indicated in step 228. Next, step 232 inputs realtime GPS signals to the GPS receiver 132, which calculate variable and inaccurate indications of latitude, longitude and altitude.

Noting that the steps of calculating the latitude and longitude from GPS signals involve similar steps, like steps have been assigned with similar numbers except that the steps of processing the latitude have been identified with a prime. The process of correcting the longitudinal data begins at step 234 and continues to step 236, which converts the indication of longitude expressed in decimal degrees to decimal minutes or by vice versa. Next step 238 determines whether the value of the longitude as calculated from the GPS signals is greater than the known, surveyed value of longitude; if greater, the process moves to step 242, which takes the difference of the surveyed and calculated values of longitude and assigns that difference or delta a negative value indicating that the differential correction will effect a shift of the base value of longitude in a negative direction to the east. However, if the value of longitude calculated from the GPS signals is greater than the surveyed value, step 240 calculates a difference and assigns that difference or delta a plus value, which indicates a positive shift to the west. Consider the following values of longitude:

True Surveyed Longitude=W. 078 degrees 12.948 minutes

False GPS/SA-on Longitude=W. 078 degrees 12.889 minutes

Here the surveyed value of longitude is less than that value calculated from the GPS signals, whereby the following differential correction is provided:

Differential Correction=W.+0.059 minutes

A similar processing of the latitudinal correction is carried out by steps 234'–246'. If the value of latitude based upon the GPS signals is greater than the surveyed value as decided in a step 238', step 242' obtains a difference therebetween and assigns that difference or delta a negative or south value. Consider the following values of latitude:

True Surveyed Latitude=N. 38 degrees 34.573 minutes

False GPS/SA-on Latitude=N. 38 degrees 34.638 minutes

Here, the value of latitude based upon the processing of the GPS signals is greater than the surveyed value and the following differential correction is provided:

Differential Correction=S.–0.065 minutes

The negative differential or delta correction indicates that the correction to be provided is in a direction to the south. A similar differential correction for altitude is provided in step 252, whereby an actually measured or surveyed value is compared with that derived by processing the GPS signals, and a differential or delta correction is outputted.

Next, step 250 facilitates transmission through the modem 136 of the differential station 40, and step 262 actuates one of the modems 98a–c whereby a bidirectional communication link is established between the command center 38 and the differential station 40. If the vehicle tracking unit 14 has a differential capability, the command center actuates its patch panel 92 in step 266, whereby a second communication link is established between the command center 38 and the vehicle tracking unit 14; then, the differential data is transmitted to the vehicle tracking unit 14 and, in particular, to its GPS receiver 48 to utilize the differential correction data and to calculate a relatively accurate value of longitude and latitude (and altitude) of the vehicle 14. In turn, the corrected values of latitude and longitude are retransmitted to the command center 38, where they are displayed against a background of street-level mapping information on the display 108. However, if the vehicle tracking unit 14 does not have a differential capability, the uncorrected values of latitude and longitude, which are obtained by processing the GPS signals, are transmitted to the command center 38, wherein the tracking computer 102 combines the uncorrected values and the differential correction to provide corrected values to the CRT 108.

There are presently approximately 1200 regional cellular systems throughout the United States. In order to communicate from one cellular phone in such system to another cellular phone in another system, it is necessary to know the telephone number of the cellular phone to be called, the roamer number for the region in which the cellular phone lies within, the band (A or B) on which the cellular phone is registered, and in which region, the cellular phone is presently disposed. Unlike when placing a long distance call on the conventional hard-wired telephone network where you typically know the area code of the person to be called, a cellular phone by its nature is not tied to a particular geographical location or area code. In the present invention, the vehicle tracking unit 14 and its cellular phone transceiver 52 is readily capable of moving from one cellular phone system to the next as the tracked vehicle 12 moves throughout the United States. Thus, the problem arises of how to identify in which system the vehicle tracking unit 14 is presently located. If the present location of the vehicle tracking unit 12 is not known, then it is necessary to call each system using its roamer number, until the vehicle tracking unit 14 is found. Such a search could potentially take a considerable amount of time.

There currently exists a nationwide paging system capable of paging a person anywhere in the United States without knowing where that person is located. The paging system includes approximately 320 regional systems throughout the United States. To send a page, the ID number of the person called is entered into a 1-800 number and that page is simulcast at the same time in each of those 320 systems over a common carrier frequency of 931 MHz. The called person will receive that page on his or her page receiver, regardless of where the person called is now located. Such a page receiver 59 and antenna 57 may be incorporated into this invention by coupling it to the auto dialer 58. Then it would not be necessary to know where the tracked vehicle 12 and its vehicle tracking unit 14 is presently located. Rather, an operator located at the command center 38 accesses the nationwide system by the common telephone to transmit a page to the remote page receiver 59. When the page is received at the remote vehicle tracking unit 14, its auto dialer 58 is prompted to place a call via the mobile telephone system 22 and the telephone network 34 whereby a data link is established between the vehicle tracking system 14 and the command center 38. By adapting the simulcast paging technology to this invention, vehicles may be tracked anywhere in the United States without previously knowing where that vehicle 12 is. Likewise a regional paging system or otherwise area transmission means could be substituted for a nationwide system.

Problems exist for position determining systems 10, which are capable of tracking an object or a vehicle 16 over a geographic area that is larger than that area which can be serviced by a single set of 3 or 4 satellites. For example, if a vehicle 16 is stolen and then moved in a truck a distance of over 500 miles, the vehicle 16 will then have a new set of satellites 12, when it reappears in the new location and again begins to receive GPS signals. Similarly, if a vehicle 16 and its vehicle tracking unit 14 are driven underground and kept in a garage where the vehicle tracking unit 14 could not receive GPS signals for a significant period of time, the vehicle tracking unit 14 when it reappeared to again receive GPS signals would be exposed to GPS signals from a new set of satellites. If the vehicle tracking unit 14 is moved too far or hid for a long period of time, it would be necessary to reinitialize its GPS receiver 48 by downloading new ephemeris and almanac data before the vehicle tracking unit 14 could again begin to process the present set of GPS signals and to begin calculating vehicle location data.

Figure 7:
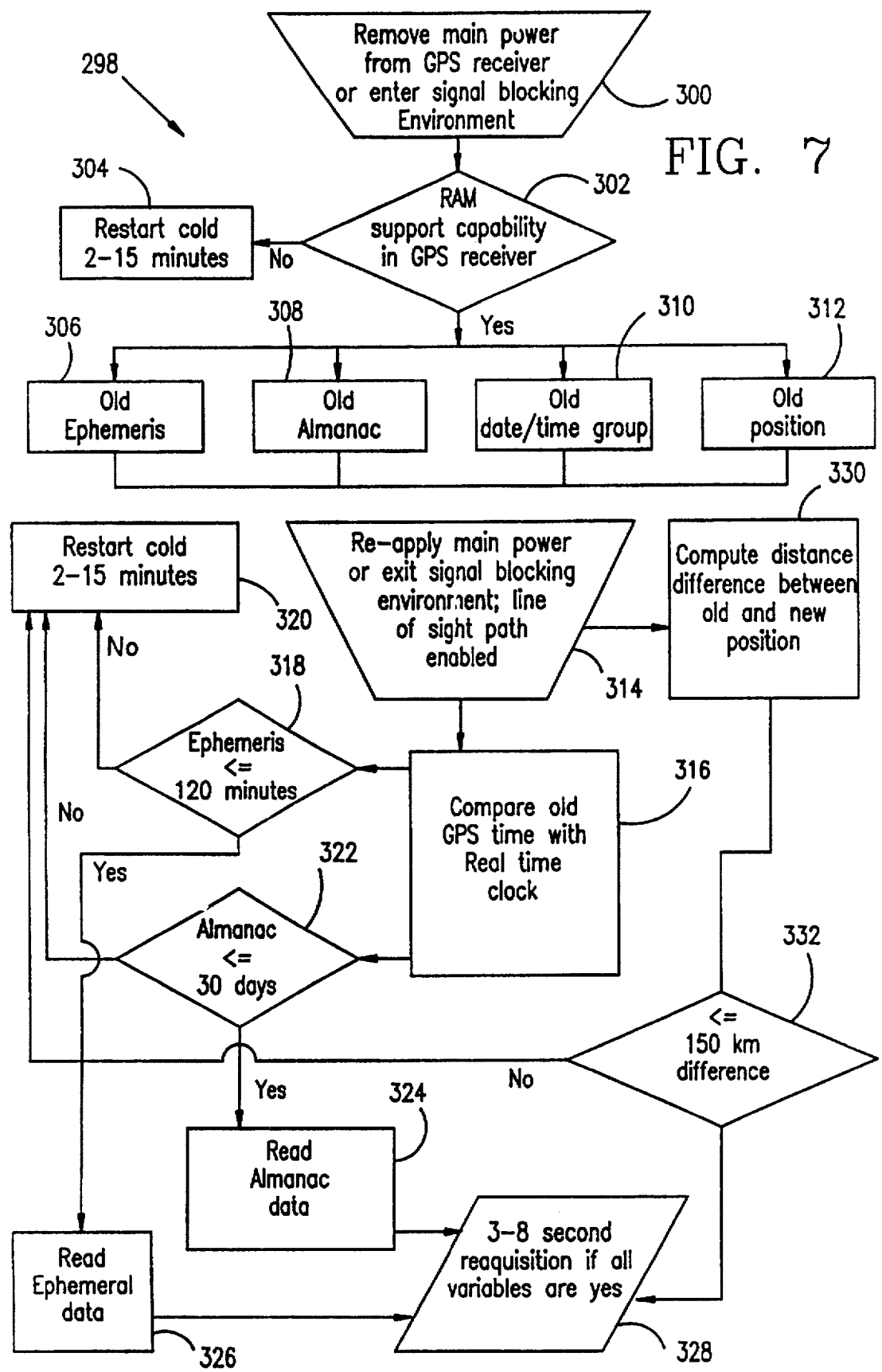
FIG. 7 is a flow diagram of a rapid reacquisition computer program executed by that computer of the ground GPS receiver included within the vehicle tracking unit of FIG. 2A.

To overcome such problems, the reinitializing program 298 is stored in the RAM 49 and executed by the CPU 156 when the vehicle tracking unit 14 reemerges and again receives the GPS signals from the new set of satellites 12. Referring to FIG. 7, the reinitializing program 298 is called when either the GPS receiver stops receiving the GPS signals or power is removed from the GPS receiver 48. The object of this program 298 is to minimize the reinitializing time when the receiver again begins to process the GPS signals. In the absence of this program 298 as suggested by step 302, reinitializing may require some 2–15 minutes as shown in step 304. When power is removed or the GPS receiver otherwise stops receiving GPS signals, the present or old ephemeris data, the present almanac, the present time and date in terms of day, month and year, and present location in terms of longitude and latitude are stored respectively in steps 306, 308, 310 and 312 in the RAM 49 as shown in FIGS. 2A and C. Noting the emergency voltage backup supply 160, the RAM 49 safely stores this data until step 314 detects that the main power has been reapplied or that the GPS receiver 48 has begun again to receive and process the GPS signals. At that instance, step 316 retrieves from RAM 49 the time that the GPS signals or power was lost and accesses the present time from the realtime clock 158. Next, step 318 determines whether the difference between these times exceeds 120 minutes and step 322 determines whether the difference between these times exceeds 30 days. Similarly, step 330 accesses the RAM 49 to obtain the latitude and longitude of the vehicle 16 when power was lost or the power failed, and obtains the present latitude and longitude of the vehicle 16. Step 330 also subtracts the former and present values of latitude and longitude to obtain the distance that the vehicle 16 has been moved. Step 332 determined whether that distance exceeds 150 KM. If the vehicle 14 has been moved more than 150 KM, the ephemeris data has not been updated for 120 minutes or the almanac has not been updated for 30 days, the reinitializing program 298 moves to step 320, which carries out a cold restart.

However, if the vehicle 16 has not been moved a distance more 150 KM and the ephemeris data has been updated within the last 120 minutes and the almanac date has been updated within the last 30 days, then step 328 can obtain a rapid reacquisition of data from at least 3 satellites, after the ephemeris data has been processed in step 326 and the almanac data in step 324.

The cold restart of step 320 requires significantly longer to complete than the rapid reacquisition of step 328. For example, a cold restart may take some 15 minutes, whereas rapid reacquisition may require only 3–8 seconds. In certain environments such as when driving in a city where tall buildings will repeatedly interrupt the reception of GPS signals, the use of repeated cold starts would essentially prevent reception of the GPS signals and the use of this location determining system 10 is such environments. Initially, in step 320, the ground GPS receiver 48 scans sequentially through each of the satellites 12 of the constellation, starting with the first satellite 12 as identified by its pseudo-random range number "n". The ground GPS receiver 48 tunes to the signals of one satellite at a time and if the signal strength of the received GPS signals exceeds a preset threshold level, the GPS receiver 48 continues to receive and process the GPS signals from that satellite 12 in its cold restart step 320. Most of the time required by the cold start step 320 results from the sequential scanning of the satellites 12. Each satellite 12 is scanned typically for some 30 seconds to ensure that it is not merely hidden, e.g., by buildings in a city environment. Thus, if there are 24 satellites in the constellation, step 320 could take at least 12 minutes to complete. Next, the GPS receiver 48 obtains and uses the clock signal from the satellite's atomic clock to resynchronize its realtime clock 158. Then step 320 tests whether the almanac data has been stored within its RAM 49 and, if so, whether the stored almanac is over 30 days old. If there is no stored almanac data stored in RAM 49 or it is too old, then new almanac data is downloaded from the accessed satellite 12 and stored in the receiver's RAM 49. After downloading a new almanac or the stored almanac was less than 30 days old, step 320 downloads current ephemeris data from each accessed satellite 12. The fresh ephemeris identifies the digital position data of the engaged satellites in the horizon of this vehicle tracking unit 14 and its GPS receiver 48. Communication is established between the other identified satellites 12 and the ground GPS receiver 48 again begins to process GPS signals and to calculate its position.

As will now be explained, the rapid acquisition step 328 is much simpler and faster. When it is determined that the ephemeris data is current within 120 minutes by step 318, the almanac is current within 30 days by step 322 and the vehicle 16 has not been moved more than 150 KM by step 332, steps 326 and 324 respectively read the emphemeris and the almanac as stored in the RAM 49, before step 328 accesses its realtime clock 158 to determine the present time. Under these circumstances, the realtime clock 158 is presumed to be accurate. Step 328 uses the present time to examine the ephemeris data to determine which satellites are invisible to this vehicle tracking unit 14 and enables its receiver 48 to commence receiving and processing the GPS signals from the identified satellites 12. Since the present satellites 12 in the horizon may be so identified, it is not necessary to scan the satellites 12 one at a time, thus significantly reducing the time to complete the rapid acquisition step 328.

When a vehicle 16 equipped with a vehicle tracking unit 14 enters a subterranean parking garage and is no longer able to receive satellite signals, its last known position and time are stored in the random access memory 49 as illustratively described in steps 312 and 310, respectively. While the cellular transceiver 52 of the vehicle tracking unit 14 may still be able to efficiently communicate with a receiver at the cell 24 by virtue of its multipath radio frequency propagation characteristics, such vehicle tracking unit 14 will not be able to receive signals from GPS satellites 12 with its receiver 48. It would be desirable to not only access the current vehicle's location when the vehicle tracking unit 14 is receiving satellite signals and continuously determining its current location, but also to access the current location of the vehicle 16 at the times satellite signal reception was lost. A "dump" of the RAM 49 provides such information. When a vehicle tracking unit 14, which is hid in a subterranean garage, is called by the command center 38 via the telephone network 34 and the cellular network 22, the modem 74 sets up a full duplex serial communications data link with the modem 98 and the tracking computer 102. It is appreciated that the cellular transceiver 52 of the vehicle tracking unit 14 may continue to receive from and transmit signals to the command center 38, even if the GPS receiver 48 losses capture of the satellite signals. When commanded to "RAM-dump" with a keyboard input, computer processing unit 156 of the GPS receiver 48 accesses the RAM 49 and IC gate 154 thus allowing the last known vehicle location and time data to be transmitted through line 51b and eventually to the command center 38. With this invention, at least the building or structure in which the vehicle 16 last entered would be revealed hence greatly limiting to a very small geographic area the present possible position of the sought vehicle 16.

Various changes and modifications in the structure of the described embodiment are possible without departing from the spirit and scope of the invention which is sought to be defined by the full scope of the terms of the claims appended hereto and their reasonable equivalents.

I claim:

1. In an antenna system for use with a plurality of satellite sources, each transmitting at least one positioning signal to at least one object moving about an environment for determining the relative position of the object within the environment, the environment from time-to-time blocking to some degree the transmission of at least one of the positioning signals to the object dependent on the relative position of the object within the environment, said antenna system comprising:

a) a plurality of antenna mounted on the object in a spaced relationship with each other, each of said plurality of antennae capable of receiving a positioning signal to provide a corresponding electrical output signal;

b) a receiver for processing said output signals to facilitate at least in part a determination of the position of the object; and c) means coupled to each of said plurality of antenna for summing and applying each of said electrical output signals to said receiver and for preventing one of said electrical output signals provided by any one of said plurality of antennae from being applied to any other of said plurality of antennae, whereby said receiver will continue to determine the position of the object when at least one of the positioning signals is at least partially blocked by the environment from at least one of said plurality of antennae.

2. The antenna system as claimed in claim 1, wherein the object is a vehicle and at least two of said plurality of antennae are disposed at opposing extremities of the vehicle.

3. The antenna system as claimed in claim 2, wherein the vehicle has front and rear windows, one of said two antennae is disposed on the front window on the passenger side of the vehicle and the other of said two antennae is disposed on the rear window on the driver side of the vehicle.

4. The antennae system as claimed in claim 1, wherein said coupling means comprise coaxial cables.

5. The antennae system as claimed in claim 1, wherein said coupling means are contained within a housing which is vibration and shock resistant.

6. The antennae system as claimed in claim 1, wherein said coupling means of each of said antennae are of equal length to sum their electrical output signals in phase with each other.

7. In an antenna system for use with a plurality of satellite sources, each transmitting at least one positioning signal to at least one object moving about an environment for determining the relative position of the object within the environment, the environment from time-to-time blocking to some degree the transmission of at least one of the positioning signals to the object dependent on the relative position of the object within the environment, said antenna system comprising:

a) a plurality of antenna mounted on the object in a spaced relationship with each other, each of said plurality of antennae capable of receiving a positioning signal to provide a corresponding electrical output signal;

b) a receiver for processing said output signals to facilitate at least in part a determination of the position of the object; and c) means coupled to each of said plurality of antenna to receive its output signal and to apply each of said electrical output signals to said receiver in a manner that one of said electrical output signals will not interfere with another of said electrical output signals, whereby said receiver will continue to determine the position of the object when at least one of the positioning signals is at least partially blocked by the environment from at least one of said plurality of antennae, said coupled means includes a diode junction to back bias the electrical output signal from each of said plurality of antennae.

8. In an antenna system for use with a plurality of satellite sources, each transmitting at least one positioning signal to at least one object moving about an environment for determining the relative position of the object within the environment, the environment from time-to-time blocking to some degree the transmission of at least one of the positioning signals to the object dependent on the relative position of the object within the environment, said antenna system comprising:

a) a plurality of antennae mounted on the object in a spaced relationship with each other, each of said plurality of antennae capable of receiving a positioning signal to provide a corresponding electrical output signal exhibits similar electrical characteristics;

b) a receiver for processing said output signals to facilitate at least in part a determination of the position of the object; and c) means coupled to each of said plurality of antennae to receive its output signal and to apply each of said electrical output signals to said receiver in a manner that one of said electrical output signals will not interfere with another of said electrical output signals, whereby said receiver will continue to determine the position of the object when at least one of the positioning signals is at least partially blocked by the environment from at least one of said plurality of antennae, said coupling means is connected together to sum said electrical output signal from each of said antennae.

9. In an antenna system for use with a plurality of satellite sources, each transmitting at least one positioning signal to at least one object moving about an environment for determining the relative position of the object within the environment, the environment from time-to-time blocking to some degree the transmission of at least one of the positioning signals to the object dependent on the relative position of the object within the environment, said antenna system comprising a) a plurality of antenna mounted on the object in a spaced relationship with each other, each of said plurality of antennae capable of receiving a positioning signal to provide a corresponding electrical output signal;

b) a receiver for processing said output signals to facilitate at least in part a determination of the position of the object; and c) means coupled to each of said plurality of antenna to receive its output signal and to apply each of said electrical output signals to said receiver in a manner that one of said electrical output signals will not interfere with another of said electrical output signals, said coupled means includes diode means for receiving said sum of the electrical output signals from said plurality of antennae and for preventing an electrical output signal from one of said plurality of antennae from being applied to another of said antennae, whereby said receiver will continue to determine the position of the object when at least one of the positioning signals is at least partially blocked by the environment from at least one of said plurality of antennae.

10. An antenna adapted to be mounted on a moveable object for receiving a right-hand circularly polarized, satellite electromagnetic transmissions, said antenna comprising:

a) a metallic member, which is configured and dimensioned to receive said right hand circularly polarized electromagnetic transmissions;

b) first and second sheets of an electrical insulating material for receiving therebetween said metal member, said first and second sheets being sealed together to form a unitary assembly enclosing said metallic member, said unitary assembly including an exterior;

c) lead means connected to said metallic member and extending to said exterior of said unitary assembly to output an electrical signal corresponding to the received electromagnetic transmissions; and d) means for coupling said lead means to said metallic member to ensure that said antenna is right-hand circularly polarized.

11. The antenna of claim 10, wherein said metallic member is of a square configuration.

12. The antenna of claim 11, where said square configuration has a diagonal dimension, said diagonal dimension set to be substantially 1.782 inches in length.

13. The antenna of claim 10, wherein said metallic member is of a circular configuration.

14. The antenna of claim 13, wherein said circular configuration has a diameter, said diameter being set to be substantially 1.782 inches in length.

15. The antenna of claim 10, wherein said metallic member has a center point, said coupling means coupling said lead means to said metallic member at a point offset from said center point to ensure that said antenna is right-hand circularly polarized.

16. The antenna of claim 15, wherein said metallic member has a dividing line passing through its center point and oriented generally in a vertical orientation, said coupling means coupling said lead means to said metallic member disposed to the left of said dividing line as one would view said antenna from the source of the electromagnetic transmissions.

17. The antenna of claim 10, wherein there is included means attached to one of said first and second sheets of insulating material for mounting said antenna on a windshield of the moveable object and indicia is disposed on the other of the first and second sheets of insulating material to disguise the nature of said antenna.

18. The antenna of claims 10, further comprising a communication apparatus coupled to said antenna for receiving from said antenna by said lead means said electrical signal and being adapted for mounting on the object, and wherein said object is capable of moving anywhere within a geographical area, said apparatus comprising:

a) cellular means actuable for transmitting addressed cellular messages;

b) means mounted on the object and coupled to said cellular transmitting means for receiving an addressed prompt message transmitted with an ID simultaneously throughout the geographical area, said cellular receiving means having a unique ID; and c) means for comparing the ID of the received prompt message with a unique address of said cellular receiving means and, if there is a match, for actuating said cellular transmitting means for transmitting its addressed cellular message.

19. An antenna adapted to be mounted on a moveable object for receiving right-hand circularly polarized, satellite electromagnetic transmissions, the moveable object having a metallic surface with an opening therein, the opening having a circumference, said antenna comprising:

a) a metallic member, which is configured and dimensioned to receive said right-hand circularly polarized, satellite electromagnetic transmissions;

b) first and second sheets of an electrical insulating material for receiving therebetween said metallic member to form an unitary assembly; and c) means for mounting said unitary assembly within an opening of the metallic surface to be electrically isolated by at least one of said first and second sheets of an electrical insulating material from the circumference to thereby inhibit the reflection of the satellite electromagnetic transmissions by the metallic surface of the moveable object.

20. The antenna of claim 19, wherein said metallic sheet has a periphery which is spaced from the circumference of the metallic surface a sufficient distance to inhibit the undesired reflection.

21. The antenna of claim 20, wherein said satellite electromagnetic transmissions have a predetermined wavelength, and said distance between said periphery of said metallic member and the circumference is set substantially equal to or greater than one-half of the predetermined wavelength.

22. The antenna of claim 21, wherein said distance is 3.74 inches.

* * * * *